(12) United States Patent
Tahara

(10) Patent No.: US 6,674,444 B1
(45) Date of Patent: Jan. 6, 2004

(54) IMAGE PROCESSING DEVICE AND METHOD, AND RECORDING MEDIUM

(75) Inventor: Kazuyoshi Tahara, Hiratsuka (JP)

(73) Assignee: Mitsubishi Plastics Inc., Tokyo (JP)

( * ) Notice: Subject to any disclaimer, the term of this patent is extended or adjusted under 35 U.S.C. 154(b) by 0 days.

(21) Appl. No.: 09/787,361

(22) PCT Filed: Sep. 17, 1999

(86) PCT No.: PCT/JP99/05089

§ 371 (c)(1), (2), (4) Date: Mar. 16, 2001

(87) PCT Pub. No.: WO00/18110

PCT Pub. Date: Mar. 30, 2000

(30) Foreign Application Priority Data

Sep. 18, 1998 (JP) .......................................... 10-264156
Apr. 6, 1999 (JP) .............................................. 11-99473

(51) Int. Cl.⁷ ................................................. G09G 5/02
(52) U.S. Cl. ...................... 345/589; 345/590; 345/591; 345/440; 382/237; 382/168; 382/169; 382/170; 382/171; 382/172
(58) Field of Search ................................ 345/589, 590, 345/591, 440; 382/237, 168–172

(56) References Cited

U.S. PATENT DOCUMENTS 5,638,090 A * 6/1997 Schnaitter et al. .......... 345/419
5,956,421 A * 9/1999 Tanaka et al. .............. 382/172
6,064,773 A * 5/2000 Yamagata ................... 382/237
6,154,217 A * 11/2000 Aldrich ...................... 345/589
6,411,737 B2 * 6/2002 Wesolkowski et al. ..... 382/237

FOREIGN PATENT DOCUMENTS

| EP | 0 363 988 A2 | 4/1990 |
|---|---|---|
| JP | 64-61765 | 3/1989 |
| JP | 2-105676 | 4/1990 |
| JP | 2-105677 | 4/1990 |
| JP | 2-171871 | 7/1990 |
| JP | 3-63884 | 3/1991 |
| JP | 4-126468 | 4/1992 |
| JP | 5-200021 | 8/1993 |
| JP | 5-304605 | 11/1993 |
| JP | 6-133124 | 5/1994 |
| JP | 9-218622 | 8/1997 |
| JP | 11-53535 | 2/1999 |

* cited by examiner

Primary Examiner—Matthew C. Bella
Assistant Examiner—Mike Rahmjoo
(74) Attorney, Agent, or Firm—Finnegan, Henderson, Farabow, Garrett & Dunner, LLP

(57) ABSTRACT

A histogram is generated by dividing pixels constituting multivalued image data loaded onto a RAM 3 into a plurality of levels. On the basis of the histogram, a level or levels are changed of at least part of the pixels of the multivalued image data. The level change enables control of the image quality of hard copy pictures. The multivalued image data, the levels of at least part of the pixels of which are changed, is converted into binary image data representing pseudo-gray levels. A printer prints the output binary image data. The hard copy picture formed on a recording medium by the printer reproduces the multivalued image data loaded onto the RAM 3 with high fidelity.

48 Claims, 32 Drawing Sheets

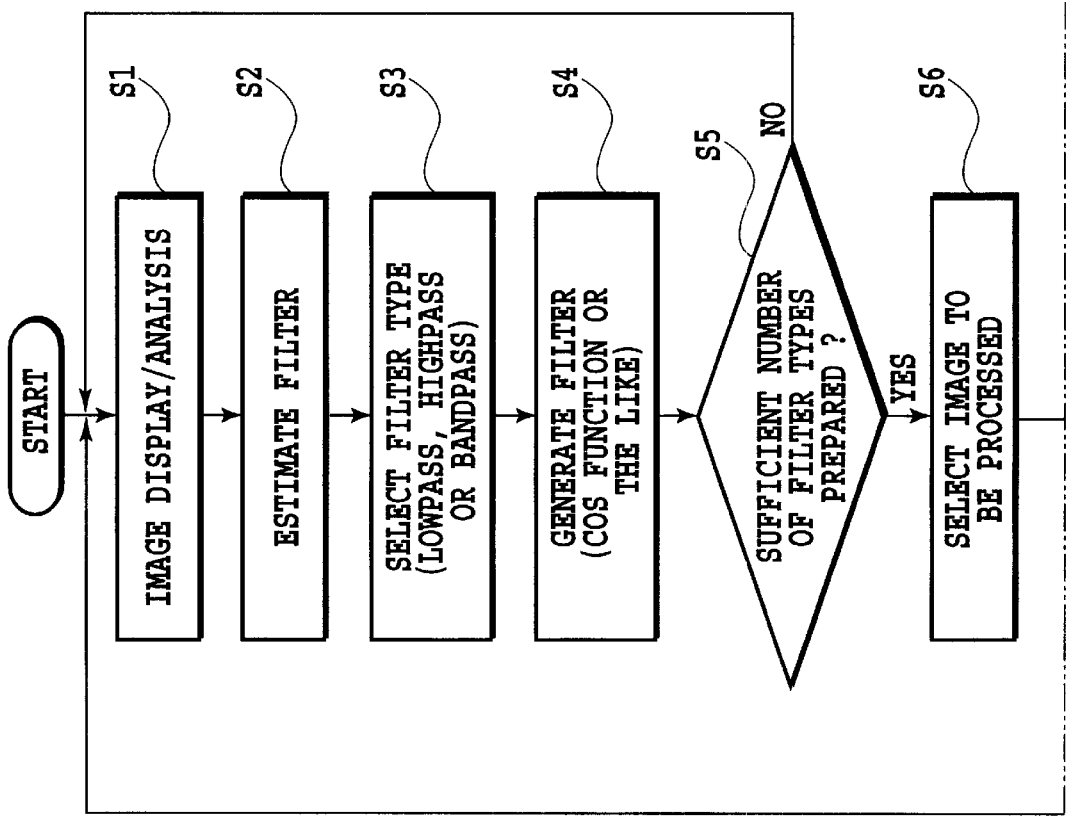

| | | | | | | |
|---|---|---|---|---|---|---|
| 0.9998 | 0.9848 | 0.9397 | 0.8660 | 0.7660 | 0.6428 | 0.500 | 0.3240 | 0.1736 | 0.175 |
| 0.9848 | 0.9698 | 0.9254 | 0.8528 | 0.7543 | 0.6330 | 0.4924 | 0.3190 | 0.1709 | 0.1723 |
| 0.9397 | 0.9254 | 0.8830 | 0.8137 | 0.7198 | 0.6040 | 0.4698 | 0.3044 | 0.1631 | 0.1644 |
| 0.8660 | 0.8528 | 0.8137 | 0.7499 | 0.6633 | 0.5566 | 0.433 | 0.2805 | 0.1503 | 0.1515 |
| 0.7660 | 0.7543 | 0.7198 | 0.6633 | 0.5867 | 0.4923 | 0.383 | 0.2481 | 0.1329 | 0.1340 |
| 0.6428 | 0.6330 | 0.6040 | 0.5566 | 0.4923 | 0.4131 | 0.3214 | 0.2082 | 0.1115 | 0.1124 |
| 0.500 | 0.4924 | 0.4698 | 0.433 | 0.383 | 0.3214 | 0.25 | 0.162 | 0.0868 | 0.0875 |
| 0.3240 | 0.3190 | 0.3044 | 0.2805 | 0.2481 | 0.2082 | 0.162 | 0.1049 | 0.0562 | 0.0567 |
| 0.1736 | 0.1709 | 0.1631 | 0.1503 | 0.1329 | 0.1115 | 0.0868 | 0.0562 | 0.0301 | 0.0303 |
| 0.175 | 0.1723 | 0.1644 | 0.1515 | 0.1340 | 0.1124 | 0.0875 | 0.0567 | 0.0303 | 0.0306 |

(ORIGINAL IMAGE) $\begin{pmatrix} x_{0,0} & x_{0,1} \\ x_{1,0} & x_{1,1} \end{pmatrix} = \begin{pmatrix} 150 & 100 \\ 80 & 120 \end{pmatrix}$ — 320

(SPATIAL (FREQUENCY) IMAGE) $\begin{pmatrix} y_{0,0} & y_{0,1} \\ y_{1,0} & y_{1,1} \end{pmatrix} = \frac{1}{2} \begin{pmatrix} 1 & 1 \\ 1 & -1 \end{pmatrix} \begin{pmatrix} 150 & 100 \\ 80 & 120 \end{pmatrix} \begin{pmatrix} 1 & 1 \\ 1 & -1 \end{pmatrix}$ $= \begin{pmatrix} 225 & 5 \\ 25 & 45 \end{pmatrix}$ — 330

FIG.21

$$\text{(ORIGINAL IMAGE)} \begin{pmatrix} x_{0,0} & x_{0,1} \\ x_{1,0} & x_{1,1} \end{pmatrix} = \begin{pmatrix} 255 & 255 \\ 255 & 255 \end{pmatrix} \Big\} 340$$

$$\text{(SPATIAL FREQUENCY IMAGE)} \begin{pmatrix} y_{0,0} & y_{0,1} \\ y_{1,0} & y_{1,1} \end{pmatrix} = \begin{pmatrix} 510 & 0 \\ 0 & 0 \end{pmatrix} \Big\} 350$$

FIG. 22

$$\text{(LOWPASS FILTER)} \begin{pmatrix} 1.0 & 0.5 \\ 0.5 & 0.25 \end{pmatrix} {\sim}360$$

$$\text{(HIGHPASS FILTER)} \begin{pmatrix} 0.2 & 0.3 & 0.5 \\ 0.3 & 0.7 & 0.8 \\ 0.5 & 0.8 & 0.95 \end{pmatrix} {\sim}370$$

FIG.23

$$\begin{pmatrix} 510 & 0 \\ 0 & 0 \end{pmatrix}^{\overbrace{\phantom{xx}}^{350}} \times \begin{pmatrix} 1.0 & 0.5 \\ 0.5 & 0.25 \end{pmatrix}^{\overbrace{\phantom{xx}}^{360}}$$

$$= \begin{pmatrix} 510 & 0 \\ 0 & 0 \end{pmatrix}^{\overbrace{\phantom{xx}}^{420}}$$

FIG.25

IMAGE PROCESSING DEVICE AND METHOD, AND RECORDING MEDIUM

TECHNICAL FIELD

The present invention relates to an image processing apparatus and method therefor and recording medium, and more particularly to an image processing apparatus and method therefor and recording medium suitable for processing monochrome multivalued images used in medical care.

BACKGROUND ART

Conventionally, when taking images of human body and the like using CT scanner, MR scanner (MRI), etc. and carrying out diagnosis in a medical field, for example, the images are usually displayed on a display such as a CRT, LCD or the like of the CT scanner, MR scanner, etc. to be observed. The display images are commonly monochrome gradation information, that is, gray scale images.

Hard copies of the images shown on the display can also be made by a printer such as an ink jet printer to be used for the diagnosis. To achieve this, analog image data are captured from a device like a CT scanner or MR scanner to be supplied to a display such as a CRT or LCD, and to be converted into digital image data and supplied to a printer like an ink jet printer. Alternatively, image data with digital gradation information are captured from a device such as a CT scanner or MR scanner to be supplied to a printer such as an ink jet printer. To make hard copies from digital image data with gradation information, that is, from multivalued image data by a printer like an ink jet printer, multivalued image data are converted into binary image data using various binarization techniques such as systematic dither, and the resultant binary image data are used to make hard copies.

The printer such as an ink jet printer, which makes hard copies from the binary image data obtained by converting the multivalued image data into binary image data, usually carries out binarization of the multivalued image data using a printer driver (software programs) to generate the binary image data, so as to obtain hard copy pictures with image quality comparable to the original images associated with the multivalued image data. The printer driver is usually attached to the printer.

Thus, although it must be considered that the image quality can be modified because of the loss of image information involved in converting the multivalued image into binary image, and hence the reduction in resolution is unavoidable, hard copy pictures are generally obtained of the image quality comparable to the original image with the multivalued image data.

However, in a specific application, the image quality of the hard copy pictures produced by the printer can differ considerably from the original image with the multivalued image data. For example, as for the hard copies made from monochrome multivalued image data captured from a device such as medical CT scanner or MR scanner, the image quality of the resultant hard copy pictures can sometimes differ considerably from the original images, the images on a display of the device such as a CT scanner or MR scanner. One of the reasons for this, is the loss of image information involved in converting multivalued images into binary images. Accordingly, the printers using a general purpose printer driver cannot achieve the required image quality of the hard copies. Apart from this, ink jet printers, for example, present another problem of producing hard copy pictures of different image quality from the same multivalued image data. This is due to the differences in the device types, ink types, ink discharge volumes from ink discharge orifices, spacing between ink discharge orifices in recording heads, and recording media.

Therefore, to achieve desired image quality of hard copy pictures in a specific application by the foregoing printers, it is unavoidable to iterate cut-and-try processings of making hard copies after carrying out suitable image processing of the multivalued image data until hard copy pictures with required image quality are obtained.

On the other hand, to reduce the load of repeating the cut-and-try processings, the following image processing has been studied. The processing converts, before making hard copies from the binary image data obtained by converting multivalued image data, the binary image data into multivalued image data to be displayed on the display, and applies suitable image processing on the multivalued image data with watching the images displayed on the monitor. For example, the assignee of the present application has filed several applications such as Japanese patent application laid-open Nos. 9-292869, 10-340339 and 11-126247.

These proposals, however, cannot accomplish satisfactory results as a whole, although they have made partial improvements.

DISCLOSURE OF THE INVENTION

Therefore, an object of the present invention is to provide, by solving the foregoing problems, an image processing apparatus and method therefor and recording medium capable of easily making hard copy pictures with image quality close to the image quality of an original image.

Another object of the present invention is to provide an image processing apparatus and method therefor and recording medium capable of generating hard copy pictures of an original image with improved image quality meeting a desired quality.

Still another object of the present invention is to provide an image processing apparatus and method therefor and recording medium capable of monitoring images with image quality close to their hard copy pictures before actually making hard copy pictures of the original image.

Finally, another object of the present invention is to provide a print result assurance method, apparatus and recording medium, which can ensure the print results of the image processing.

According to a first aspect of the present invention, there is provided an image processing apparatus comprising: a histogram generator for generating a histogram by dividing pixels constituting multivalued image data into levels; a multivalued image processor for changing levels of at least part of the pixels of the multivalued image data using the histogram generated by the histogram generator; and binarization means for converting the multivalued image data, the levels of at least part of the pixels of which are changed by the multivalued image processor, into binary image data representing pseudo-gray levels.

According to a second aspect of the present invention, there is provided an image processing method comprising: a histogram generating step of generating a histogram by dividing pixels constituting multivalued image data into levels; a multivalued image processing step of changing levels of at least part of the pixels of the multivalued image data using the histogram generated by the histogram generator; and a binarization step of converting the multivalued image data, the levels of at least part of the pixels of which are changed by the multivalued image processor, into binary image data representing pseudo-gray levels.

According to a third aspect of the present invention, there is provided a recording medium having computer readable image processing program code means for causing computer to process image data, the image processing program code means causing the computer to execute: a histogram generating step of generating a histogram by dividing pixels constituting multivalued image data into levels; a multivalued image processing step of changing levels of at least part of the pixels of the multivalued image data using the histogram generated by the histogram generator; and a binarization step of converting the multivalued image data, the levels of at least part of the pixels of which are changed by the multivalued image processor, into binary image data representing pseudo-gray levels.

According to a fourth aspect of the present invention, there is provided a print result assurance method of ensuring print results of image processing by an image processing apparatus, the print result assurance method comprising the step of: inputting into the image processing apparatus a password that is set in and proper to a specific recording medium; and enables the image processing apparatus to print when the password is correct.

According to a fifth aspect of the present invention, there is provided an apparatus for ensuring print results of image processing, the apparatus comprising: means for inputting password that is set in and proper to a specific recording medium; and means for allowing printing when the password is correct.

BRIEF DESCRIPTION OF THE DRAWINGS

FIG. 17 is a diagram showing a relationship between FIG. 17A and FIG. 17B;

FIG. 17A is a flowchart illustrating the details of the first spatial frequency processing;

FIG. 18 is a list showing an example of numeric data 200 of a cosine function;

FIG. 19 is a list showing two-dimensional damped waveform data using the cosine function;

FIG. 21 is a diagram showing an example of a DCT processing;

FIG. 22 is a diagram showing another example of the DCT processing;

FIG. 23 is a diagram showing a concrete example of a spatial frequency filter;

FIG. 25 is a diagram showing an example of the multiplication result;

BEST MODE FOR CARRYING OUT THE INVENTION

The embodiments in accordance with the present invention will now be described with reference to the accompanying drawings.

Figure 1:
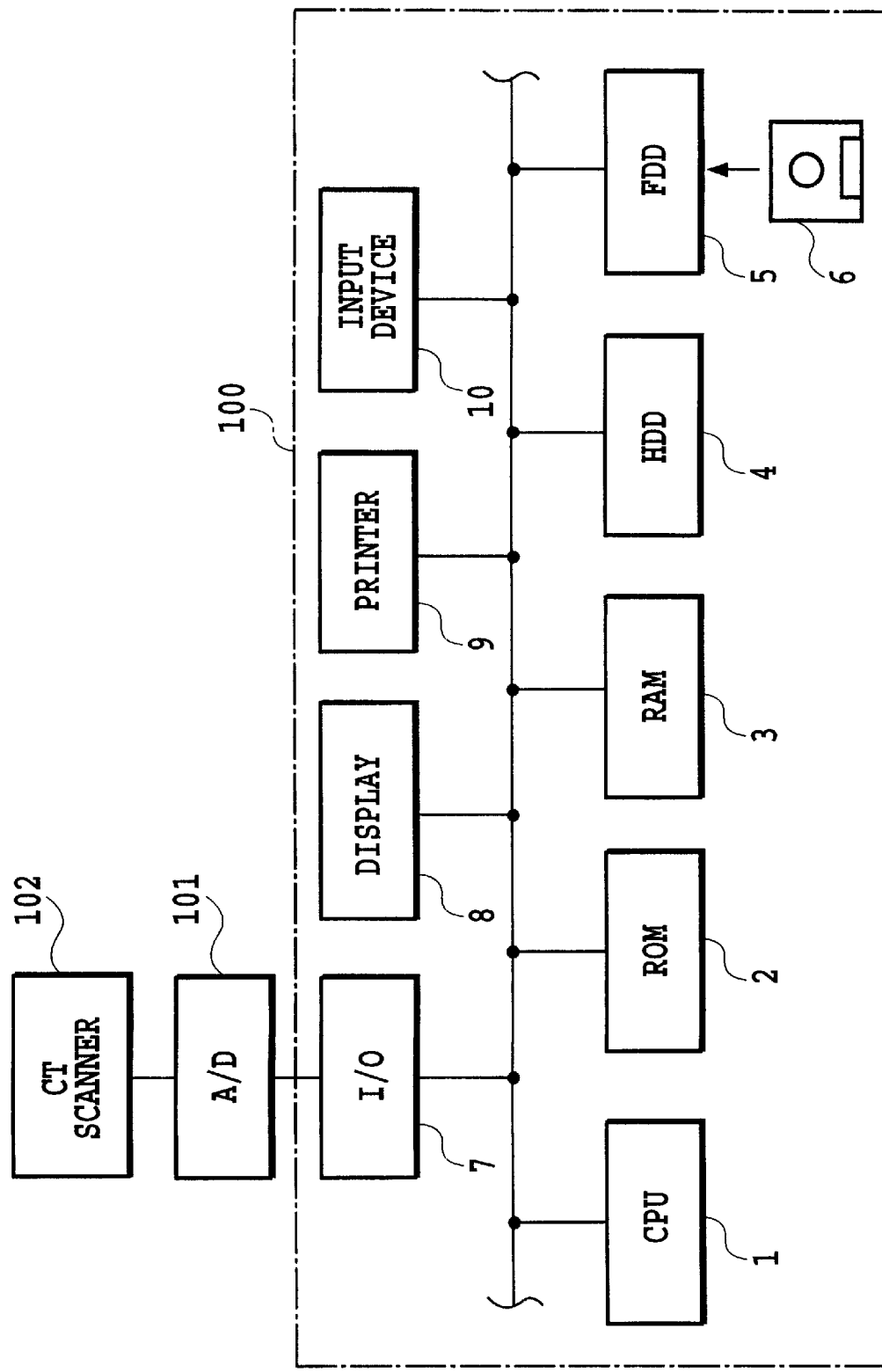
FIG. 1 is a block diagram showing a hardware configuration of an image processing apparatus associated with an embodiment in accordance with the present invention.

FIG. 1 is a block diagram showing a hardware configuration of an image processing apparatus associated with an embodiment in accordance with the present invention. For example, analog image data with gradation information, which is fed from a CT scanner 102 carrying out CT scanning, is captured by a computer system 100 through an interface (I/O) 7, after undergoing A/D conversion by an A/D converter 101. The computer system 100 comprises a CPU 1; a ROM 2 and a RAM 3 constituting a memory; a hard disk drive 4 and a floppy disk drive 5 constituting a storage; a printer 9 for recording, on a recording medium, hard copy pictures corresponding to binary image data; a display 8 for monitoring images to be printed by the printer 9; and an input device 10 such as a keyboard and a pointing device (like a mouse). The ROM 2 and/or a hard disk in the hard disk drive 4 install programs for processings that will be described below, and a printer driver program for the printer 9, which are executed by the CPU 1.

Next, the image processing executed by the image processing apparatus with the foregoing configuration will be described in detail.

Figure 2:
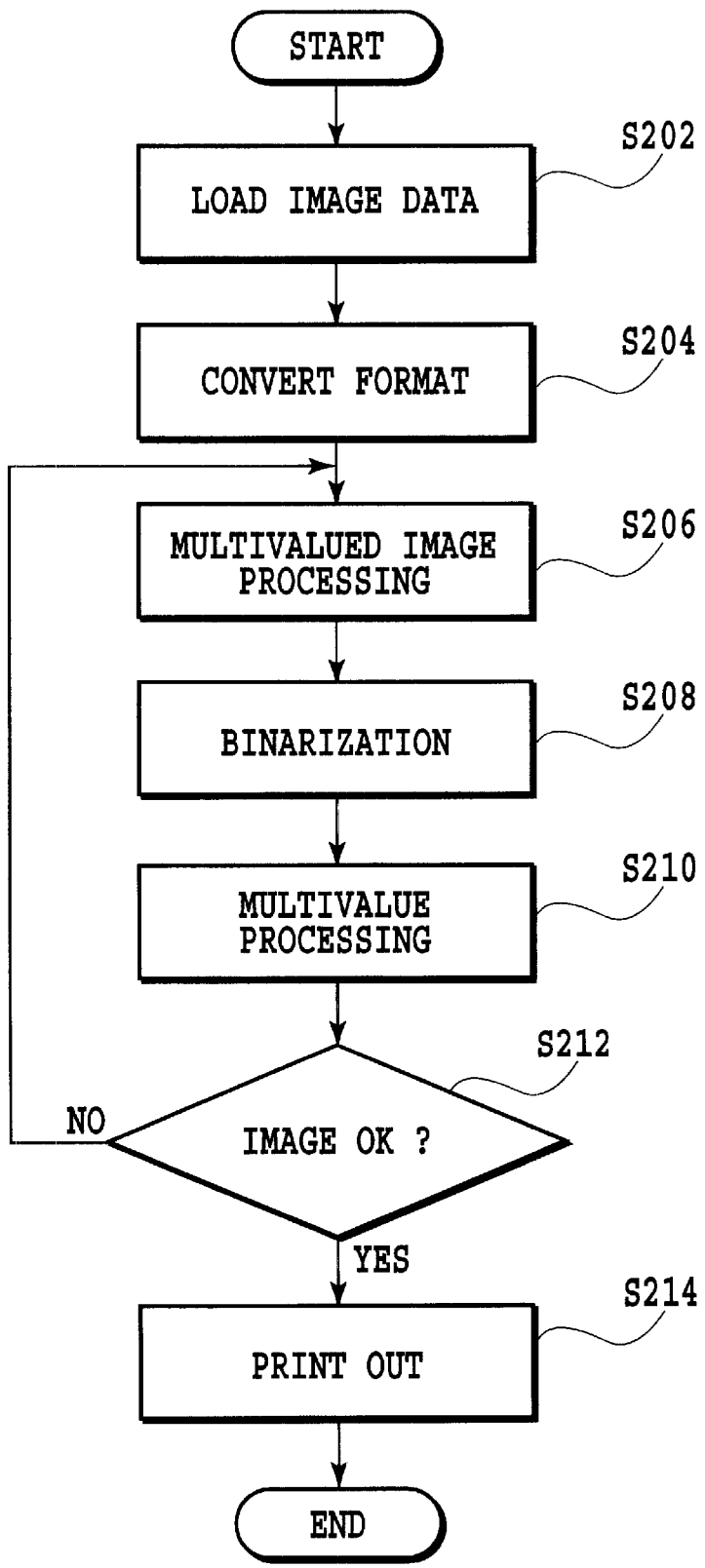
FIG. 2 is a flowchart illustrating a basic processing of the present embodiment.

FIG. 2 is a flowchart illustrating a basic processing of the present embodiment. First, the multivalued image data is captured from the CT scanner 102 to the computer system 100 (S202). In this case, the analog image data from the CT scanner 102 is captured by way of the A/D conversion by the A/D converter 101 as shown in FIG. 1, or digital multivalued image data is captured from the CT scanner 102 immediately without passing through the A/D converter 101, or from a large capacity recording medium that stores the multivalued image data. The multivalued image data captured is temporarily stored in the RAM 3.

Subsequently, the multivalued image data captured undergoes a format conversion processing (S204). The format conversion processing identifies the format of the multivalued image data captured, and converts the format unless it is the format the computer system 100 can handle. It is unnecessary to carry out the format conversion processing if the format of the image data captured is the format the computer system 100 can handle. For example, the U.S. radiology school employs a format referred to as DICOM. In Japan, not only this format, but also a format unique to Japan is used. The present image processing employs the TIF format that is generally used by image files, and hence the multivalued image data with a format other than this format must be converted into the TIF format.

The multivalued image data subjected to the format conversion processing experiences a multivalued image processing (S206), which will be described later in more detail. After passing through the multivalued image processing, the multivalued image data undergoes a binarization processing by a systematic dither or the like using a printer driver program (S208). The data obtained by the binarization processing is supplied to the printer 9 to be recorded on a recording medium as a hard copy picture to which pseudo-gray levels are assigned. The binary image data extracted from the data obtained through the binarization processing undergoes a multivalue processing (S210) to generate multivalued image data to be displayed on the display 8 as will be described later in more detail. Subsequently, the multivalued image data to be displayed obtained through the multivalue processing (S210) is displayed on the display 8. The image displayed on the display 8 is monitored (S212), and if an image of desired image quality is obtained, the printer 9 records its hard copy picture on a recording medium (S214). Unless the desired image quality is obtained at step S212, the multivalued image processing is redone after carrying out processings such as changing certain parameters and the like at step S206. In this case, since the printer 9 does not record any hard copies, it is possible for the printer 9 to avoid wasting a recording medium, time for the copy and the like. Thus, hard copies of a desired image quality can be obtained. Incidentally, the processings at steps S210 and S212, that is, the confirmation of the image quality of the image displayed on the display 8 can be omitted, and the printer 9 can produce the hard copy without carrying out the display.

Next, the multivalued image processing in the foregoing step S206 will be described. The multivalued image processing can perform the best suited processing for each region of interest to be processed, or without limiting a region of interest. The multivalued image processing consists of the following image processings $\hat{1}$–$\hat{8}$, and a concrete example thereof is shown in Table 1.

$\hat{1}$ Brightness control processing #1.
$\hat{2}$ Brightness control processing #2.
$\hat{3}$ Contrast-up processing #1.
$\hat{4}$ Contrast-up processing #2.
$\hat{5}$ Gamma correction processing.
$\hat{6}$ Black-down processing.
$\hat{7}$ Spatial frequency filtering processing.
$\hat{8}$ Other processings.

As shown in Table 1, various multivalued image processings are prescribed for individual regions of interest of a human body to be subjected to the scanning processing by the CT scanner 102. Each multivalued image processing consists of at least three image processings selected from the image processings $\hat{1}$–$\hat{8}$ as shown in Table 1, and the image processings are executed in accordance with the sequence shown in the columns of Table 1. Table 1 also shows other multivalued image processings, that is, another processing #1, another processing #2 and another processing #3. The another processing #1 is appropriate for cerebral angiography, for example. Another processing #2 is suitable in the case where only unsatisfactory results are obtained by the multivalued image processing for head, chest, abdomen and limbs, for example. The another processing #3 is appropriate for processing MRI images or for obtaining hard copies of transparent images (that is, when using film as the recording medium), for example.

TABLE 1

| | multivalued image processing (regions to be processed) | | | | | | |
|---|---|---|---|---|---|---|---|
| Processing sequence | head | chest | Abdomen | limbs | another region #1 | another region #2 | another region #3 |
| * first | ② | ② | ② | ① | ② | ① | ④*2 |
| 4 second | ⑤ | ⑤ | ⑤ | ⑤ | ⑤ | ③ | ⑤ |
| third | ③ | ④ | ④ | ③ | ③ | ⑤ | ④*3 |
| fourth | ⑥ | ⑥ | ⑥ | ⑧*1 | ⑧*1 | ③ | ⑧*1 |
| fifth | ⑧*1 | ⑦ | ⑧*1 | | | ⑧*1 | |
| sixth | | ⑧*1 | | | | | |

*1Another processing ⑧ is added when necessary.
*2Only processings (1) and (2) of the contrast-up processing #2 are executed, as will be described below.
*3Additional processing is carried out after the contrast-up processing #2, which will be described later in supplemental remarks about the another processing #3 of the multivalued image processing.
*4contents of image processing.

Next, the individual image processings constituting the multivalued image processing will be described.

Preprocessing

Figure 3:
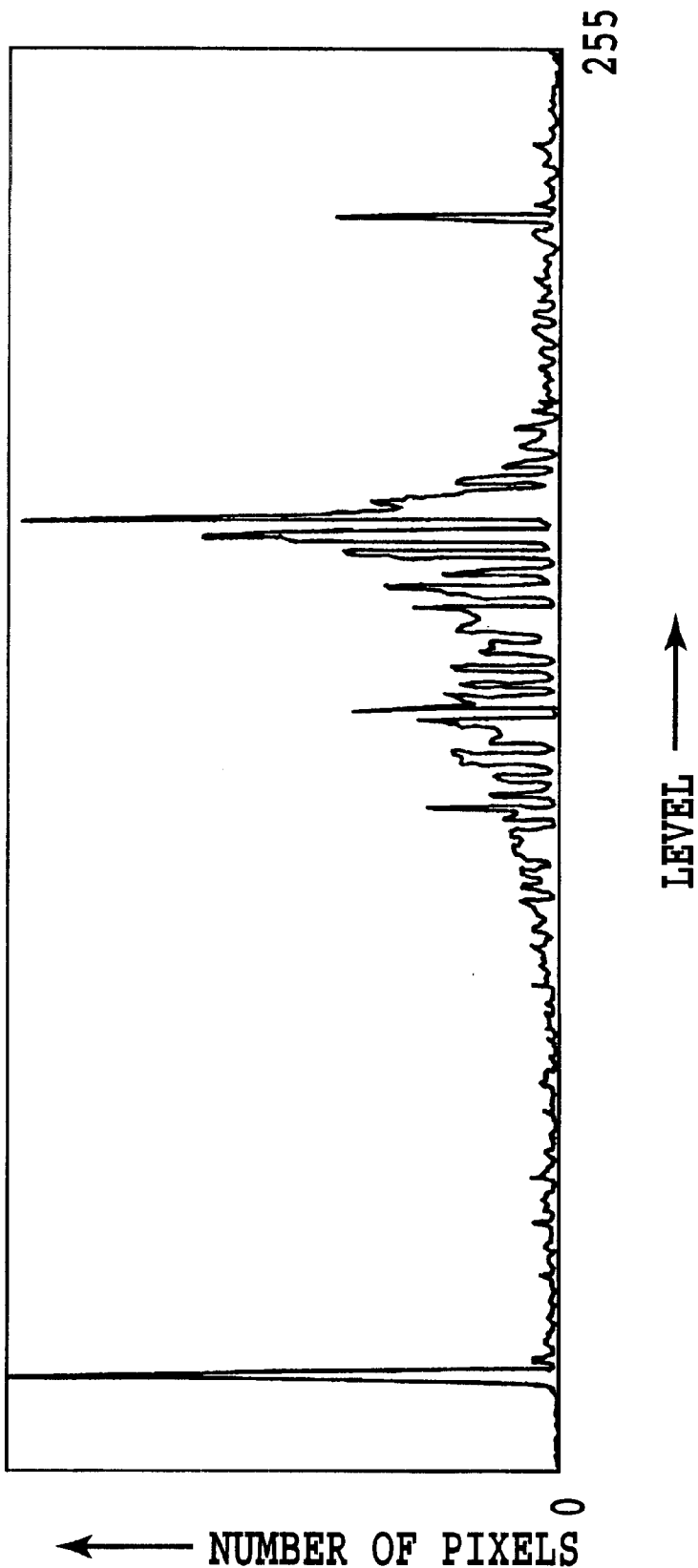
FIG. 3 is a diagram showing an example of a histogram made from multivalued image data.

First, a preprocessing will be described which is common to all the multivalued image processings, and is carried out before the foregoing image processings $\hat{1}$–$\hat{8}$. The preprocessing generates histogram data needed for the subsequent processings from the multivalued image data passing through the format conversion at step S204. The histogram appears as a line graph on a drawing as shown in FIG. 3, for example. It is made by sorting all the pixels of 8-bit multivalued image data constituting one image (the number of all the pixels is 262144), and by counting the numbers of pixels of individual levels (the total of 256 levels from 0 to 255). (The histogram shown in FIG. 3 is a histogram after executing the brightness control processing #1 which will be described later).

Brightness Control Processing #1

This processing is provided for preventing dark areas in the multivalued image from being crushed in the binarization. The crush is due to the binarization processing or characteristics of a printer like an ink jet printer.

The binarization of the multivalued image data will sometimes eliminate from binary image data the low luminance pixels thinly scattered in dark areas in a multivalued image. Even if these pixels remain, they are sometimes not displayed. Accordingly, the dark areas are particularly vulnerable to crush.

In addition, in an ink jet printer, each dot formed on a recording medium will increase its area because of ink running, which will further darken thick areas than expected. Although the ink running varies depending on ink and a recording medium used, it is indispensable for forming smooth images. The ink running, however, is apt to crush dark areas of the image.

To avoid variations in gray-level reproducibility of the dark regions due to the crush, the brightness control is chiefly carried out to brighten the dark areas.

Such processing is possible because the gamma of the medical original image data is one. An increase of the brightness of an image with a gamma other than one can sometimes impair its gray levels. In addition, it is necessary to carry out the brightness control before the gamma correction by a printer because the gray levels can be impaired after the correction of the gamma characteristics.

In the histogram of the multivalued image data captured, it often occurs that no pixel is present near the maximum value (level 255), or that even if some pixels are present, the number of the pixels is less than a reasonable minimum pixel number for that level, and hence the change in the level is unperceived and inconspicuous. The brightness control processing #1 is executed for increasing the overall brightness utilizing these facts. More specifically, it is carried out as follows.

(1) If there are such levels in the maximum value (level 255) and its nearby levels that include pixels less than the reasonable minimum pixel number (10, for example), these levels are combined to the level that has pixels greater the reasonable minimum number and is closest to these levels.

(2) After the level change, the levels of the entire histogram are shifted up by an amount corresponding to the levels including only insufficient pixels.

Figure 4:
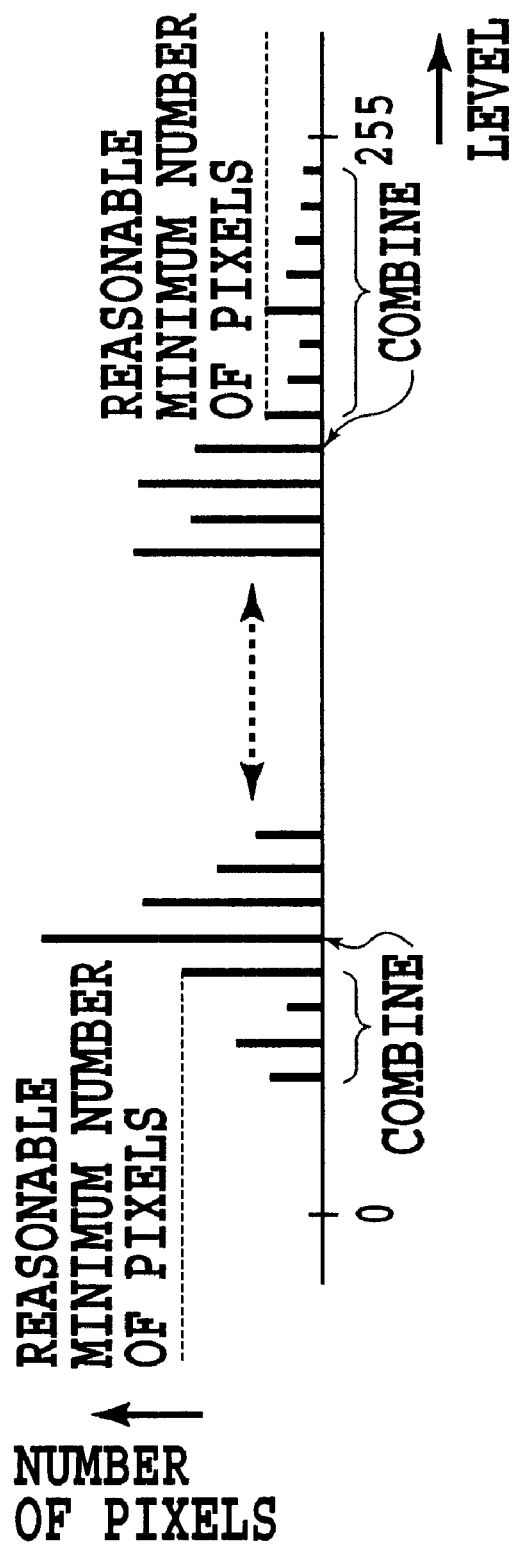
FIG. 4 is a diagram showing another example of the histogram made from multivalued image data.

FIG. 4 will help understand the idea of the processing (1). The reasonable minimum pixel number refers to such a number that will be neglected by human vision as compared with the total number of pixels constituting one image, which can be determined experimentally. For example, if the deletion of pixels from an image makes no difference in the images before and after the deletion, the number of the deleted pixels is assumed to be a negligible number. Such a test is iterated for various images, and the reasonable minimum number of the pixels can be determined.

This will be described by way of example. The following Table 2 is an example of a histogram near the maximum value.

TABLE 2

| Level | ... | 248 | 249 | 250 | 251 | 252 | 253 | 254 | 255 |
|---|---|---|---|---|---|---|---|---|---|
| Pixel numbers | ... | 269 | 300 | 6 | 4 | 3 | 0 | 0 | 0 |

First, when the reasonable minimum pixel number is 10, each level of the pixels whose number is less than the reasonable minimum pixel number is combined to the level that includes pixels more than the reasonable minimum pixel number, and is closest to the maximum value. In the present example, the levels of the pixels in the levels 250–252 are changed to the level 249. The result is shown in Table 3.

TABLE 3

| Level | ... | 248 | 249 | 250 | 251 | 252 | 253 | 254 | 255 |
|---|---|---|---|---|---|---|---|---|---|
| Pixel number | ... | 269 | 313 | 0 | 0 | 0 | 0 | 0 | 0 |

Subsequently, the entire levels of the pixels are shifted up by an amount of that space. The result is shown in Table 4, in which the mark * denotes the numbers of pixels after the level change.

TABLE 4

| Level | ... | 248 | 249 | 250 | 251 | 252 | 253 | 254 | 255 |
|---|---|---|---|---|---|---|---|---|---|
| Pixel number | ... | * | * | * | * | * | * | 269 | 313 |

Thus, the brightness control processing #1 increases the brightness of the image in its entirety.

Brightness Control Processing #2

The brightness control processing #2 performs on the pixels at levels near the minimum value a processing similar to the brightness control processing #1 performed on the levels near the maximum value, before increasing the entire brightness of the image. More specifically, if there are such levels in the minimum value (level 0) and its nearby levels that include pixels of the number less than a reasonable minimum pixel number (although it is usually greater than the reasonable minimum pixel number defined in the brightness control processing #1, the pixels less than this number are inconspicuous), these levels are combined to the level that has pixels greater the reasonable minimum number and is closest to these levels. FIG. 4 will help understanding of the idea of the processing.

In the level conversion of the pixels less than the reasonable minimum pixel number by the brightness control processings #1 and #2, it sometimes occurs that a few pixels not scattered but gather together are not negligible. Taking account of this, it is possible to control such pixels, which are present in a certain spatial area and have the number greater than a fixed number, such that they maintain their own levels. Specifically, the multivalued image data associated with a sheet of image is divided into a plurality of blocks on the image plane. Then, a decision is made as to whether the total number of the pixels in each level in each block is greater than a reasonable minimum pixel number. If the decision is positive, the foregoing control of the pixels is carried out. It should be noted, however, that such a processing takes a lot of time.

Other Brightness Control Processings

Although the brightness control processings #1 and #2 increase the brightness, it is sometimes necessary to reduce the brightness of an image in its entirety. Such a case takes place when a level (darkest level), which takes a relative maximum number of pixels near the minimum value in the histogram, is higher than a predetermined level (level 15, for example) before the brightness control. In this case, the overall levels of the pixels are shifted down until the level (darkest level) taking the relative maximum value comes to a particular level (level 7, for example). This is because the over all levels rise too high due to some reasons. In the processing, the pixel levels that will be shifted down below the minimum value (that is, 0) are changed to the particular level. Thus, in the corresponding multivalued image processings in Table 1, the histogram of the multivalued image data is checked, before carrying out the brightness control processing #1 or #2, to decide as to whether the level (darkest level) taking the relative maximum pixel number near the minimum level is higher than the particular level (level 15, for example). If the decision is positive, the brightness of the entire image can be reduced without executing the brightness control processing #1 or #2.

Gamma Correction Processing

Figure 5:
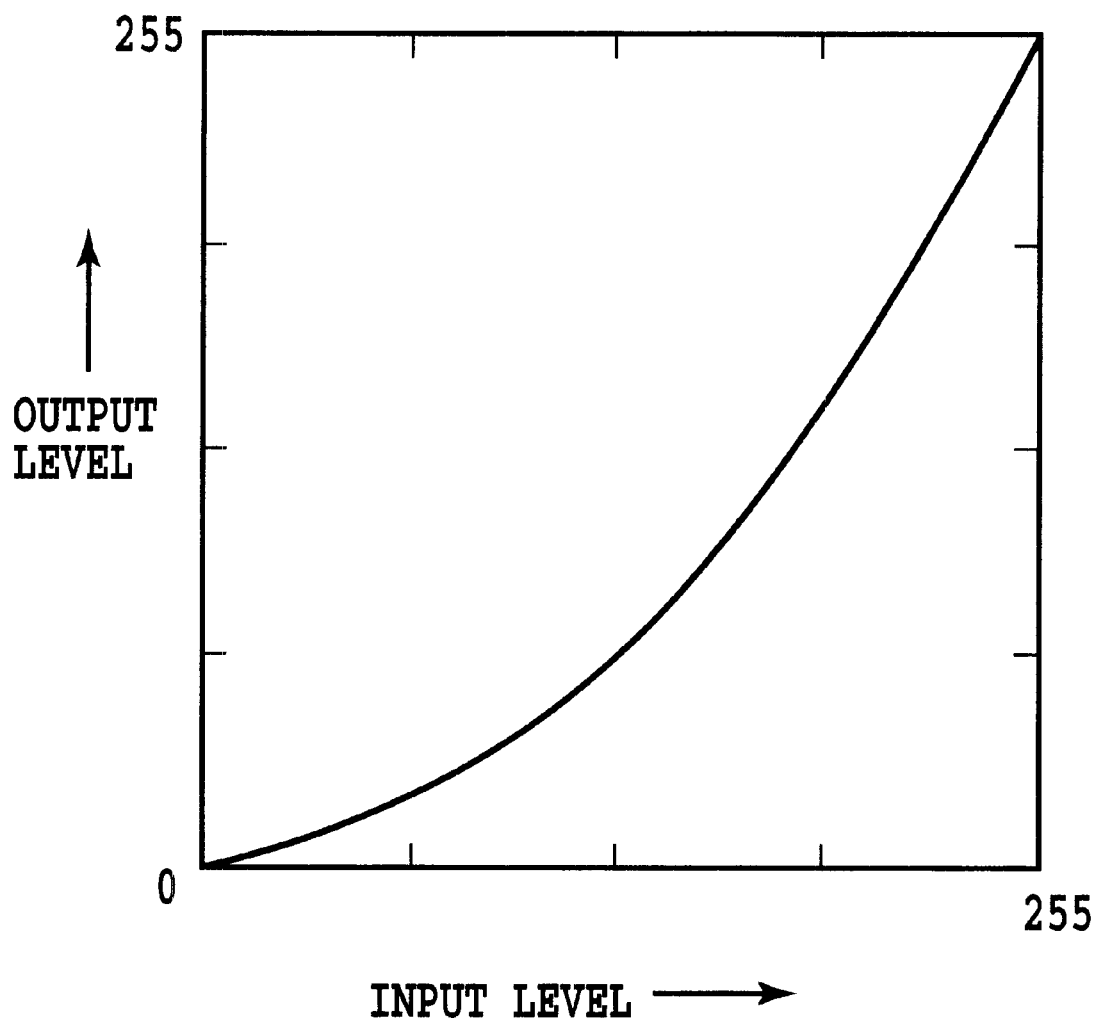
FIG. 5 is a diagram showing an example of a gamma correction characteristic.
Figure 6:
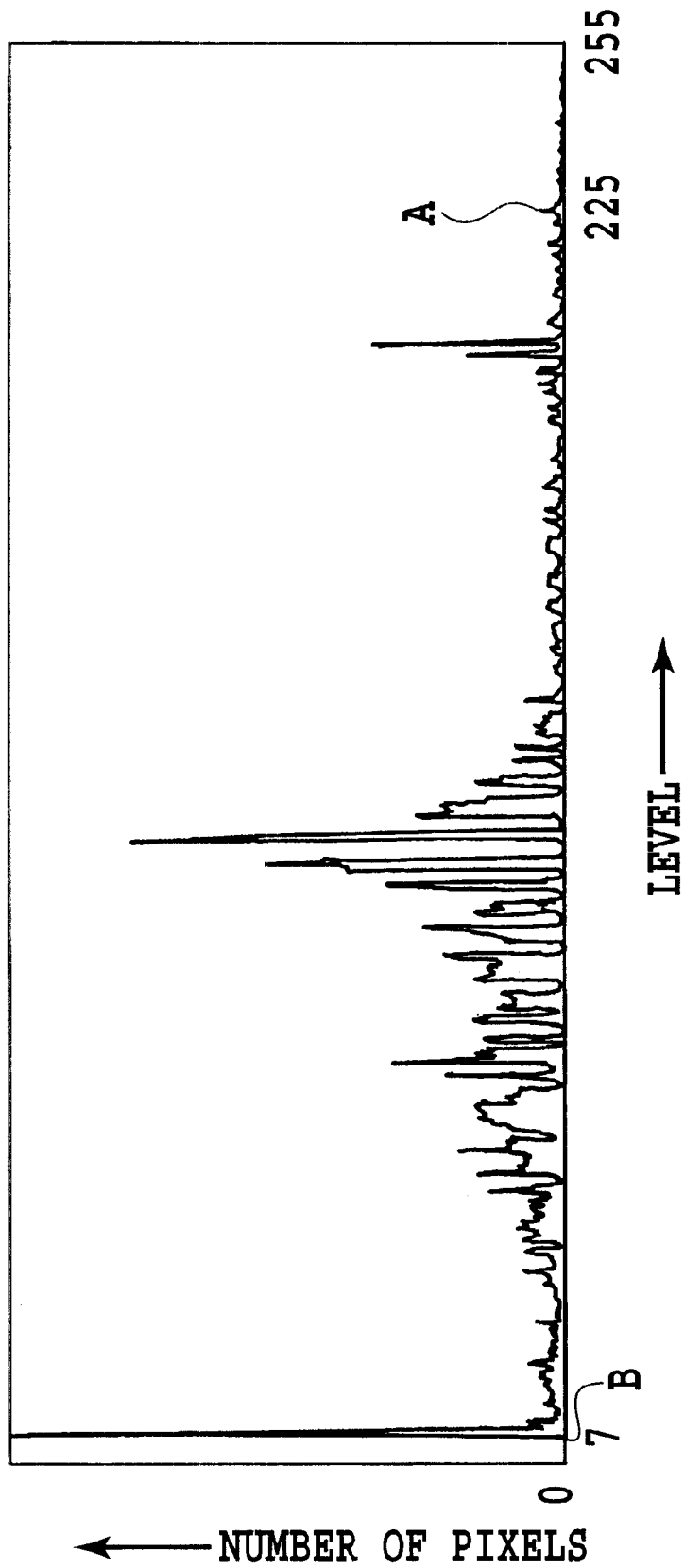
FIG. 6 is a diagram showing another example of the histogram made from multivalued image data.

To reproduce the gray scale of the original image (the gamma of the original image is one), it is necessary to correct the gamma characteristic of the printer 9 (the gamma characteristic of an ink jet printer, for example, are obtained by identifying its printer driver program, ink used and a recording medium for recording hard copy pictures, and by measuring the concentration of the images on the recording medium versus levels of input multivalued data. The concentration measurement is carried out using a reflection density meter. If at least one of the printer driver program, the ink used and the recording medium of hard copy pictures is different, the gamma characteristic will be different. A different type of the ink jet printer will also result in different gamma characteristic). The gamma correction processing is carried out by converting input levels to output levels as shown in gamma correction characteristic of FIG. 5. FIG. 6 shows a histogram obtained by carrying out, on the basis of the gamma correction characteristic as shown in FIG. 5, the gamma correction of the multivalued image data with a histogram as shown in FIG. 3.

Another concrete example of obtaining the gamma correction characteristic will be described. In this example, a gray scale modification table representing the gamma correction characteristic is obtained.

A procedure for generating a gray scale modification table used for gamma correction processing will now be described. First, multivalued image data with the normal gray levels 0–255 is binarized using the printer driver of the printer 9. Then, the printer 9 records, on the basis of the binarization data, a hard copy of a test chart corresponding to the multivalued image data with the gray levels 0–255 on a specified recording medium using specified ink. Scanning on the test chart, a reflection density meter measures concentrations at every three different points of each of the gray levels. Subsequently, the average concentration of each gray level is obtained by calculating the arithmetic mean of the values obtained by the reflection density meter. The average concentrations are assigned to the normal gray levels 0–255, and are stored in the RAM. An example of the relationships between the normal gray levels 0–255 and the average concentrations is shown in part in Table 5.

TABLE 5

| normal gray levels | average concentration |
| --- | --- |
| 0 | 2.05 |
| 62 | 0.98 |
| 126 | 0.36 |
| 255 | 0.06 |

As shown in Table 5, the average concentration of the normal gray level 0 is a maximum concentration, whereas the average concentration of the normal gray level 255 is a minimum concentration. Subsequently, corrected concentration is calculated by the following expression.

(Maximum concentration−minimum concentration)×((255−d)/ 255)+minimum concentration where d is normal gray level The corrected concentrations obtained are related to the normal gray levels, and are stored in the RAM. The relationships between the corrected concentration and the normal gray levels are shown in part in Table 6.

TABLE 6

| normal gray levels | corrected concentration |
| --- | --- |
| 0 | 1.99 + 0.06 = 2.05 |
| 62 | 1.50 + 0.06 = 1.56 |
| 126 | 1.00 + 0.06 = 1.06 |
| 255 | 0.00 + 0.06 = 0.06 |

After that, a concentration closest to the corrected concentration is retrieved from the normal gray level/average concentration table, and the normal gray level corresponding to the retrieved average concentration is retrieved from the table as a substitute gray level. The substitute gray levels thus obtained are stored in the RAM in connection with the normal gray levels corresponding to the corrected concentrations. For example, when it is found from the normal gray level/average concentration table that the value closest to the corrected concentration 1.06 of Table 6 is 1.07, and that the normal gray level corresponding to the concentration 1.07 is the gray level 51, and in addition that the concentration closest to the corrected concentration 1.56 of Table 6 is 1.55, and that the gray level corresponding to the concentration 1.55 is the gray level 22, the correspondence between the normal gray levels and the substitute gray levels are related as shown in the gray scale modification table, Table 7.

TABLE 7

| normal gray levels | substitute gray level |
| --- | --- |
| 0 | 0 |
| 62 | 22 |
| 126 | 51 |
| 255 | 255 |

According to the gray scale modification table of Table 7, the input data level (normal gray level) is transformed into the output data level (substitute gray level).

Figure 7:
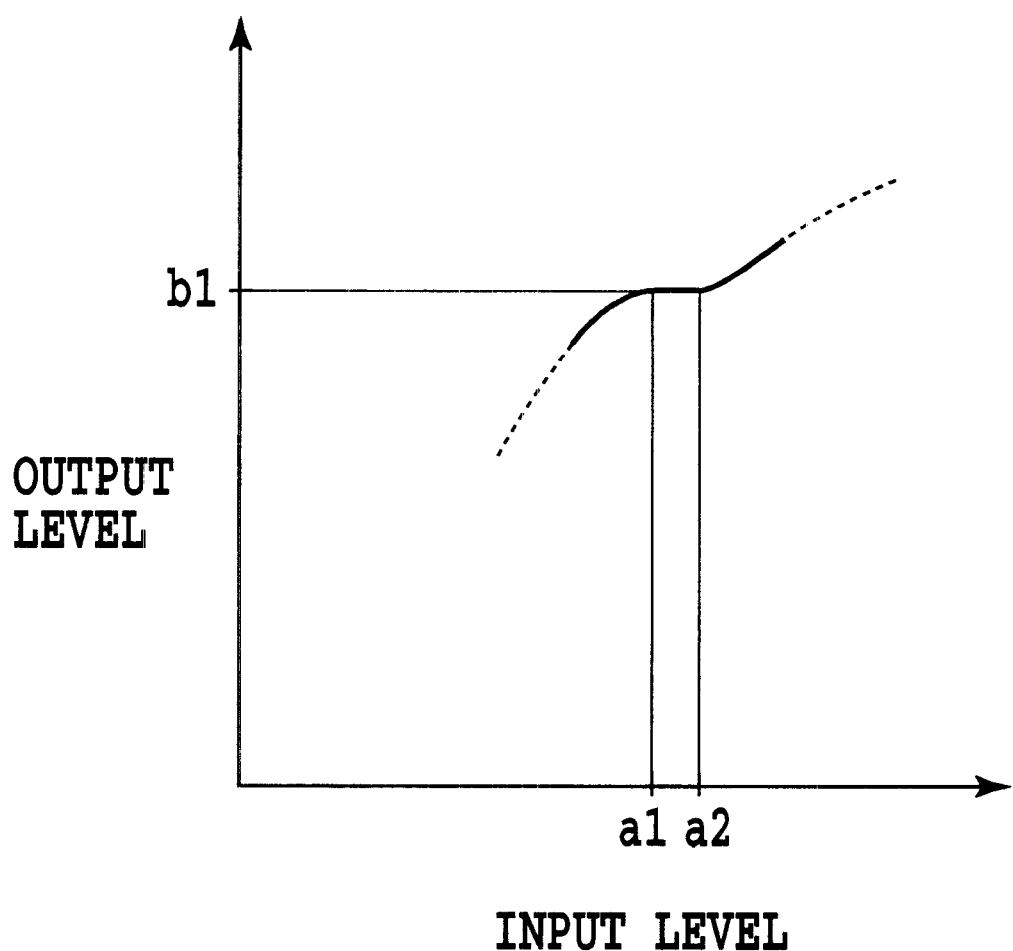
FIG. 7 is a diagram showing another example of the gamma correction characteristic.

Furthermore, using the gamma correction curve as shown in FIG. 7, for example, will enable the following processing. In FIG. 7, both input levels a1 and a2 are related to an output level b1, impairing the quality of the gray level. In view of this, pixels of the input levels (a1 and a2, in this case) which are transformed into the same output level are subjected to the gamma correction processing after they are shifted to different higher or lower levels. This makes it possible to correctly represent the gray levels.

Figure 8:
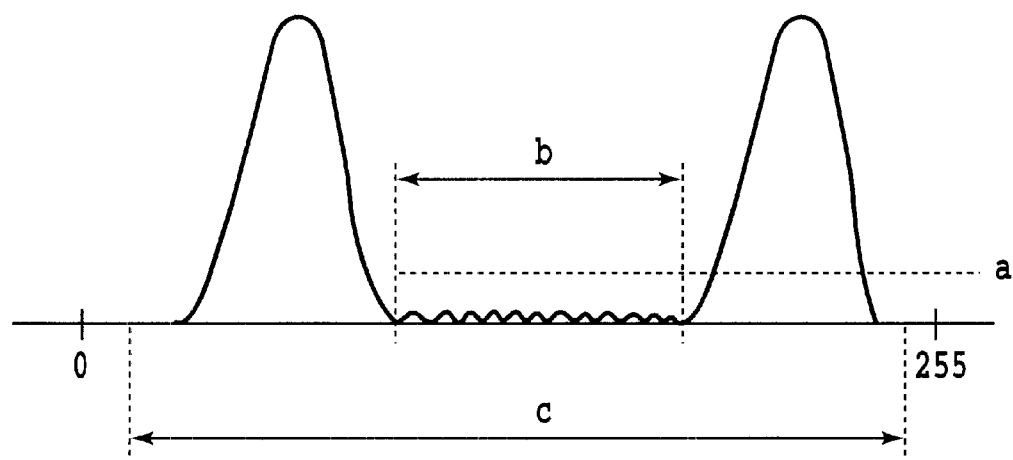
FIG. 8 is a diagram showing still another example of the histogram made from multivalued image data.

Moreover, the gamma correction can employ different gamma correction curves as follows. First, as for the multivalued image data of one sheet of image, the image plane is divided into a plurality of blocks, and a histogram is generated for each block. Then, a decision is made as to whether each block includes one or more extremely bright regions and one or more extremely dark regions at the same time, so that different gamma correction curves are applied depending on whether the bright and dark regions coexist or not. The decision on the coexistence is made for the histogram of each block when more than predetermined numbers of pixels are present in the levels corresponding to the bright regions and dark regions; and when there is not between the two levels a pixel level that includes more than a pixels, a rather few pixels, as shown in FIG. 8, for example, and the number of levels including a or less pixels is equal to or greater than b and less than c.

The decision on the absence of the coexistence is made when at least one of the conditions (1) and (2) are not satisfied.

The values a, b and c can be obtained experimentally, although they may vary depending on the regions of the body to which they are applied.

Figure 10:
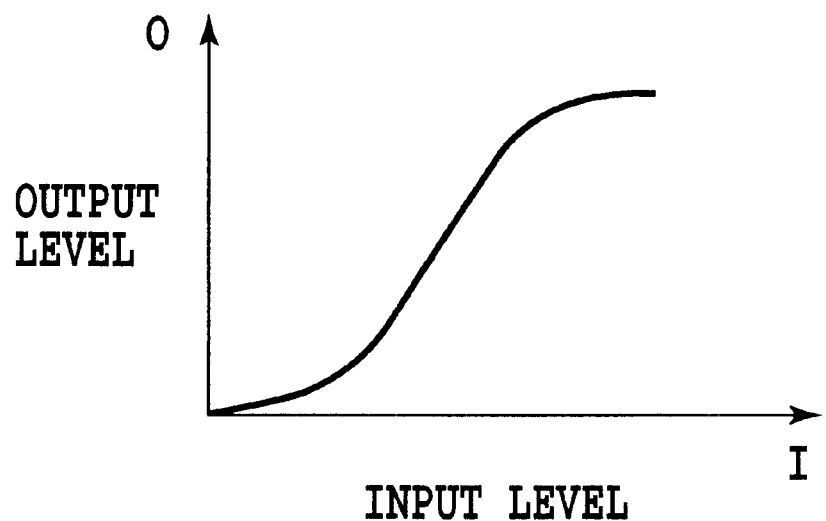
FIG. 10 is a diagram showing still another example of the gamma correction characteristic.
Figure 11:
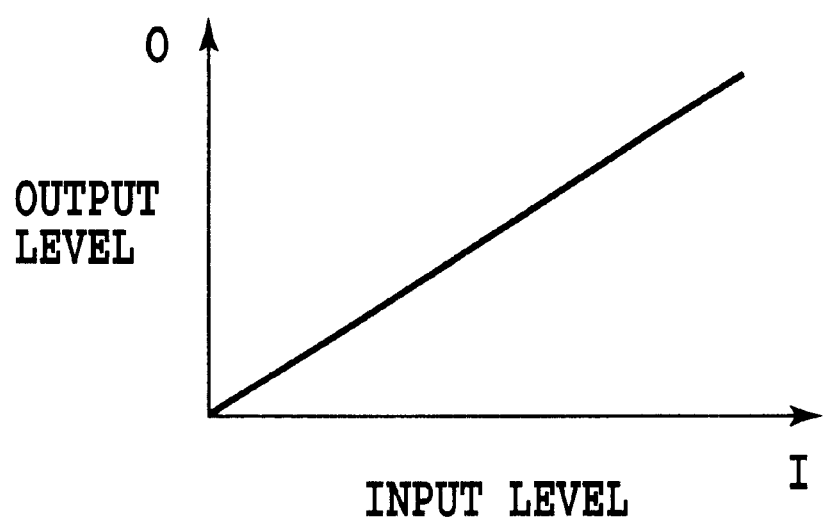
FIG. 11 is a diagram showing still another example of gamma correction characteristic.
Figure 12:
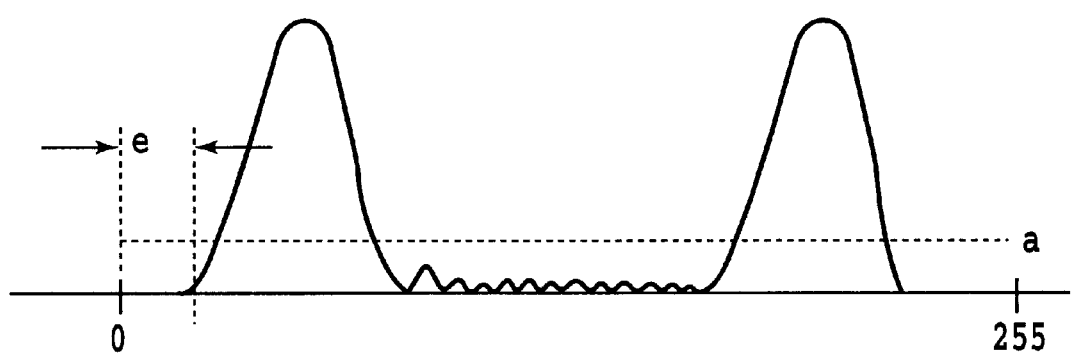
FIG. 12 is a diagram showing still another example of the histogram made from multivalued image data.
Figure 13:
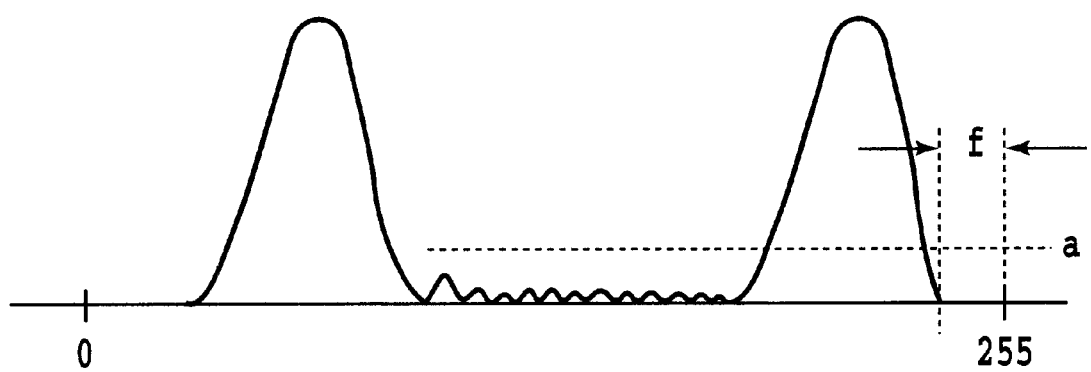
FIG. 13 is a diagram showing still another example of the histogram made from multivalued image data.

When a positive decision is made about the coexistence, the gamma correction curve as shown in FIG. 10 is employed, whereas when a negative decision is made, the gamma correction curve as shown in FIG. 11 is applied. In the block in which the extremely bright regions coexist with the extremely dark regions, portions of the gamma correction curve corresponding to these regions have a slop milder than the remaining portions as shown in FIG. 10, and the remaining portions have a slop greater than that of FIG. 11. This makes it possible for the blocks, in which the extremely bright regions coexist with the extremely dark regions, to eliminate the extreme difference between bright and dark regions, improving appearance. It is also possible for each block to shift up or down all the pixels in the block after the decision about the block and before the gamma correction. The shift up condition is met as shown in FIG. 12, for example, when the number of the levels from the minimum value (0) to the level at which the number of pixels exceeds a is e or less. In contrast with this, the shift down condition is met as shown in FIG. 13, for example, when the number of the levels from the maximum value (255) to the level at which the number of pixels exceeds a is f or less. As a concrete example, e and f can be set at a suitable value equal to or less than 10.

This will further improve the appearance of the overall image. Because the gamma of the multivalued image data for medical care is one, the transform of the brightness will not change the gray-scale characteristics.

Contrast-up Processing #1

For example, on the histogram of the multivalued image data after the gamma correction, the pixel numbers in the bright regions (higher level areas) and dark regions (lower level areas) can change from the pixel numbers before the gamma correction. In this case, the minimum level after the gamma correction, in which any pixels are present, is fixed, and all the remaining pixel levels are shifted up to substantially increase the contrast. This is the contrast-up processing #1.

Specifically, the contrast-up processing #1 is executed as follows.

(1) Using the histogram of the multivalued image data, the pixel number in the maximum value (255) is checked. If the number is equal to or less than a predetermined number (for example, 0.5% of all the pixel number, which is determined experimentally), the pixel level of the maximum level is combined to the adjacent level (254). After the combining, if the pixel number of that level still remains equal to or less than the predetermined number, the pixel level whose pixel number is equal to or less than the predetermined number is further combined to the next adjacent level. Such processing is continued until the pixel number in the current highest level exceeds the predetermined number.

(2) Subsequently, with fixing the minimum pixel level in which any pixels are present, a level conversion processing for sequentially shifting up the remaining pixel levels is carried out so that the maximum level and its nearby levels without including any pixels are replaced with lower levels.

The contrast-up processing #1 will be described by way of example. Let us assume in the histogram of the multivalued image data after the gamma correction as shown in FIG. 6 that the pixel number accumulated from the maximum value (255) and on exceeds 0.5% (1310) of the total pixel number (262144) at level 225 designated by the symbol A, and that the lowest level in which any pixels are present is level 7 designated by the symbol B. In this case, all the pixels in the levels higher than the level 225 are collected in the level 225. The pixels collected in the level 225 are converted to the maximum level (255). The lowest level in which the pixels are present is fixed. The pixels in a remaining level X are changed to a level Y by the following expression.

$$Y=7+(255-7)*(X-7)/(225-7)$$

(Where Y is round off to the nearest integer)

The numbers 7 and 225 in the equation correspond to the levels 7 and 225, and they are changed in accordance with the level change.

Contrast-up Processing #2

The contrast-up processing #2 executes the following processing (1) for the pixels near the maximum value in the histogram of the multivalued image data; and the following processing (2) for the pixels near the minimum value; followed by the following processing (3).

(1) If there is a level with a pixel number equal to or less than the reasonable minimum pixel number (10, for example) in levels near the maximum value (level 255), that pixel level is combined to the closest level that has a pixel number greater than the reasonable minimum pixel number. FIG. 4 will help understanding this processing.

Figure 14:
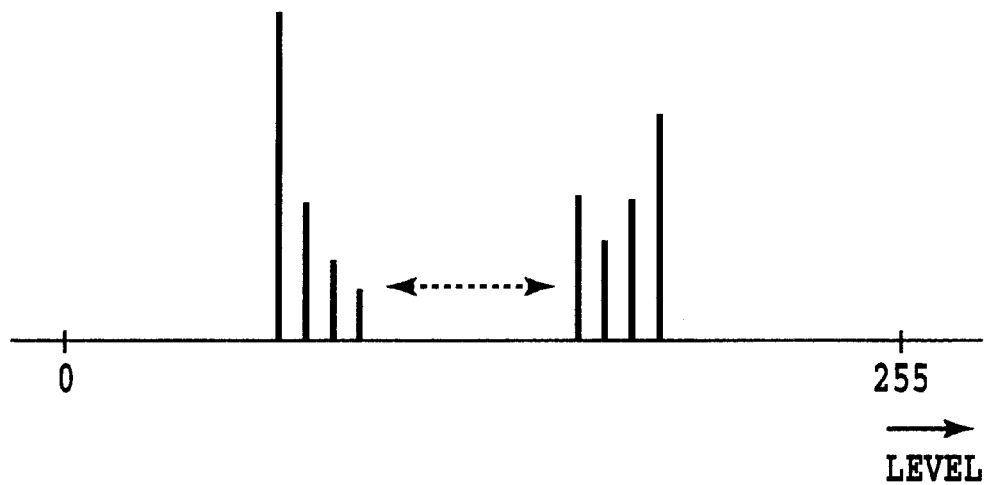
FIG. 14 is a diagram showing another example of the histogram after modifying pixel levels.

(2) If there is a level with a pixel number equal to or less than a reasonable minimum pixel number (which is usually greater than the reasonable minimum pixel number in the processing (1)) in levels near the minimum value (level 0), that pixel level is combined to the closest level that has a pixel number greater than the reasonable minimum pixel number. FIG. 4 will help understanding this processing. FIG. 14 shows a histogram after these processings (1) and (2).

(3) Subsequently, with fixing the minimum pixel level in which any pixels are present, a level conversion processing for sequentially shifting up the remaining pixel levels is carried out so that the maximum level and its nearby levels without including any pixel are replaced with lower pixel levels. For example, it is assumed that the closest level obtained in the forgoing processing (1), which has the pixel number greater than the reasonable minimum pixel number, is a level 225, and that the lowest level in which any pixels are present is a level 7. In this case, the pixels collected in the level 225 are converted to the maximum level (255). The lowest level 7 in which the pixels are present is fixed. The pixels in a remaining level X are changed to a level Y by the following expression.

$$Y=7+(255-7)*(X-7)/(225-7)$$

(Where Y is round off to the nearest integer)

The numbers 7 and 225 in the equation correspond to the levels 7 and 225, and they are changed in accordance with the level change.

Figure 15:
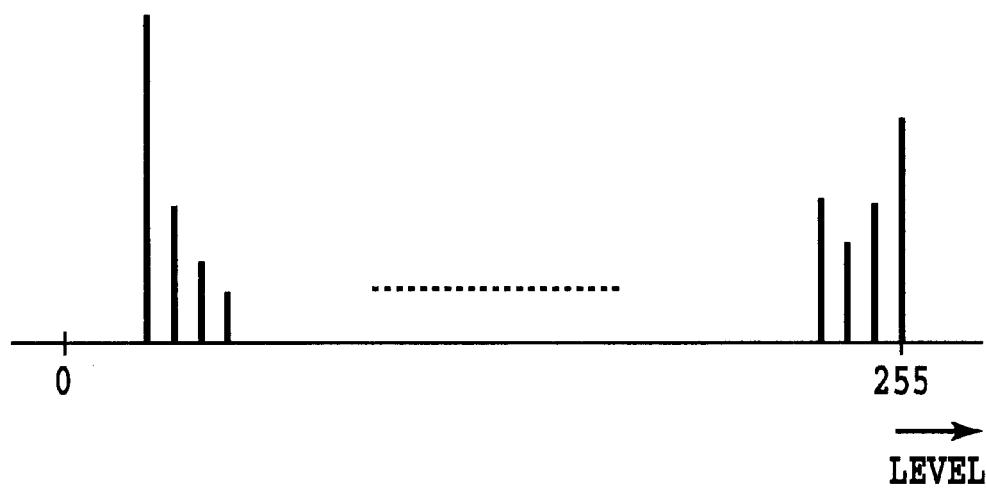
FIG. 15 is a diagram showing still another example of the histogram after modifying pixel levels.

FIG. 15 shows an example of the histogram obtained as the results of the foregoing processings.

Supplemental Explanation of Another Processing #3 of Multivalued Image Processing After the contrast-up processing #2 at the third processing step in Table 1, the lowest pixel level including pixels in the histogram is converted to the minimum value (that is, 0). In this case, if the pixel number in the second lowest level is equal to or less than a prescribed pixel number (for example, a given number between 10 and 30), the pixels in the second lowest level can also be converted to the minimum value. The foregoing processing is called processing (4). The prescribed pixel number can be obtained experimentally. Specifically, if the level change of a level with the prescribed pixel number does not make any difference in perception, this level is assumed to have a pixel number that can be assimilated to another level. In addition, in accordance with an image type, it is also possible for the processing (2) in the contrast-up processing #2 corresponding to the first and third processing steps in Table 1 to omit, even when there is a level with a pixel number equal to or less than the reasonable minimum pixel number, the conversion processing of that level to another level. Likewise, depending on the image type (such as captured regions in a body), it is also possible to omit the foregoing processing (4). As a decision rule to omit these processings, a fact is applicable that pixels equal to or greater than the predetermined number are not present in lower levels nearby the minimum value in the histogram.

Contrast-up Processing #3

As a contrast-up processing #3, which can replace the contrast-up processing #1 or #2 in the multivalued image processings in Table 1, there is the following processing.

The processing tries to increase the contrast through such a processing that makes the pixel numbers even in the respective levels in the histogram of the multivalued image data. It will be described in more detail by way of example.

Assume that the lowest level in which pixels are present is level 7. All the pixels (262144) are equally divided and assigned to each of the 248 (=255−7) levels from the level 7 to the maximum value 255. In other words, pixel levels are changed such that these levels each include 1057 (=262144/248) pixels.

For example, assume that the pixels are distributed from the level 7 as the following Table 8.

TABLE 8

| Level (i) | 0 | ... | 6 | 7 | 8 | 9 | 10 | 11 | 12 | ... |
|---|---|---|---|---|---|---|---|---|---|---|
| Pixel number (Pi) | 0 | ... | 0 | 100 | 150 | 300 | 1000 | 1200 | 500 | ... |

First, with sequentially summing up from the level 7 the pixel numbers of the adjacent levels, the level is detected at which the sum total exceeds the number 1057. In the foregoing example, because P7+P8+P9+P10=1550>1057, all the pixels from the level 7 to level 9 plus 507 (=1000−(1550−1057)) pixels in the level 10 are assigned to the level 7. In this case, a decision on which pixels in the level 10 are to be assigned to the level 7 can be made by means of random selection, or by taking account of neighboring levels of the pixels, for example.

The pixels to be assigned to the adjacent level 8 are determined in a similar manner. Because the sum of the remaining 493 (=1000−507) pixels in the level 10 and the pixels in the level 11 exceeds the number 1057 (493+1200=1693), the remaining 493 pixels in the level 10 and 564 (=1200−(1693−1057)) pixels in the level 11 are assigned to the level 8. Pixels to be assigned to the adjacent level 9 are determined in a similar manner. Because the sum (636+500=1136) exceeds the number 1057 (493+1200=1693) at level 12, the remaining 636 (=1200−564) pixels in the level 11 and 421 (=500−(1136−1057)) pixels in the level 12 are assigned to the level 9. Thus, the pixel number of the succeeding levels are made equal from the lower levels.

Incidentally, although the lowest level in which any pixels are present is assumed to be fixed in the contrast-up processing #3, it can be varied. That is, as in the foregoing brightness control processing, the pixels in a level with a pixel number equal to or less than the reasonable minimum pixel number can be changed to a level with the reasonable minimum pixel number.

Black-down Processing

As described above, the brightness-up processing and the like carries out such pixel level conversion that increases the brightness of the overall image. In other words, a level with pixels representing darkest regions differs from the minimum value. Because of a property of medical images, it is not rare that such darkest regions occupy the largest area of these images, constituting a background of the entire images. The black-down processing changes such pixel level that originally corresponds to the darkest regions (a level taking a relative maximum of the pixel numbers near the minimum value) to the minimum value (level 0).

More specifically, with sequentially checking the pixel number from the minimum value on the histogram, the level with a pixel number equal to or greater than an experimentally predetermined value is detected. Because that level is the level to become the darkest regions, all the pixel levels equal to or less than that level are changed to the minimum value. For example, in the histogram as shown in FIG. 6, because the pixel number exceeds the prescribed number for the first time at the level 7, all the pixel levels equal to or less than the level 7 are changed to level 0. Thus, the black-down processing is carried out. Pixel levels of the level 8 and onward are unchanged.

Incidentally, when checking the pixel numbers sequentially on the histogram from the minimum value, it is sometimes found that levels including pixels greater than the prescribed number take place consecutively. Because the pixels in the consecutive levels should constitute the darkest regions, the pixel levels equal to or less than the consecutive levels can be changed to the minimum value.

Spatial Frequency Filter Processing

As will be described below, there are three spatial frequency filtering processings, and any one of them can be executed. For example, in the loop of FIG. 2 passing through the steps S206, S208, S210 and S212 and returning to the step S206, the spatial frequency filtering processing can be achieved by carrying out the following processing. Alternatively, after determining an optimum filter by the following processing, the spatial frequency filtering processing can be achieved using the optimum filter in the related multivalued image processings in Table 1.

(I) First Spatial Frequency Filtering Processing

Figure 16:
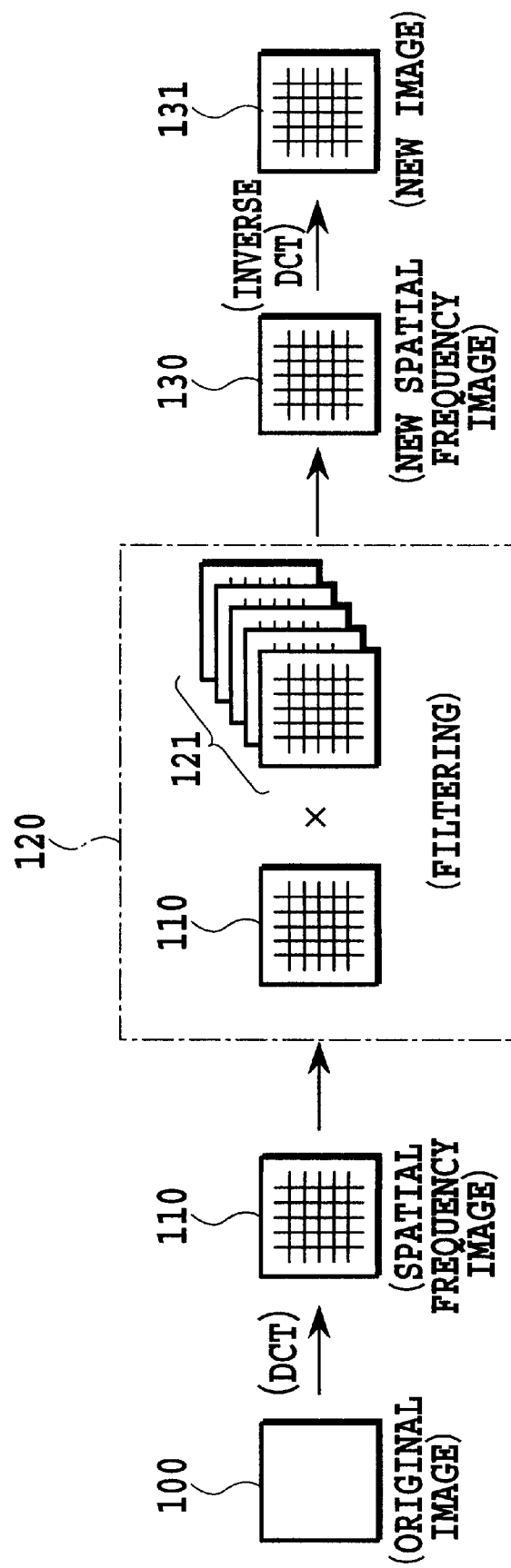
FIG. 16 is a schematic diagram illustrating the concept of a first spatial frequency processing.

In FIG. 16, for example, multivalued image data 100 passing through the prescribed processings in the foregoing Table 1 is converted to multivalued spatial frequency image data 110 by DCT (Discrete Cosine Transform) processing. The multivalued spatial frequency image data 110 is multiplied by one of spatial frequency filters 121 through the spatial frequency filtering processing 120, and is converted to new multivalued spatial frequency image data 130 with desired image quality. The new multivalued spatial frequency image data 130 is inversely converted to new multivalued image data 131 by an inverse DCT processing. The new multivalued image data 131 passing through the inverse conversion has the desired image quality, thereby enabling reliable observation of the locations of interest.

Consider the spatial frequency filtering processing 120 in more detail.

In spatial frequencies, the main contents the wideband frequencies provide to images are resolution and sharpness. Images rich in high spatial frequency components have higher resolution and sharpness than other images.

An image that provides clear contours to human eyes is said to have high sharpness, which means that high spatial frequency components are contained in the image. In contrast with this, an image with blurred contour suggests that it includes no or little high spatial frequency components.

In view of these facts, a filter processing with the following conditions (1)–(3) is carried out.

(1) The scale of the spatial frequency filters 121 corresponds to the scale of the spatial frequency image data 110. For example, when the spatial frequency image data 110 is two-dimensional data with a size of 512×512, the spatial frequency filters 121 also have the size of 512×512. Alternatively, the spatial frequency image data can be divided into a plurality blocks of the same size, and the spatial frequency filter can have the same size as the block. This enables the spatial frequency filter to process the spatial frequency image data block by block.

(2) A plurality of spatial frequency filters 121 are prepared so that one of various image qualities can be selected. For example, a bandpass filter is prepared to extract a spatial frequency range to be enhanced, whereas a lowpass filter or highpass filter is prepared to eliminate a spatial frequency range to be weakened.

(3) Furthermore, various values associated with the spatial frequency filters 121 are varied in accordance with the individual coefficients in the frequency space constituting the spatial frequency image data 110. For example, with using a value in the range of 1–0 as the values of the spatial frequency filters 121, the regions to be enhanced in the image are assigned one or near one, whereas the remaining regions are assigned zero or near zero. Furthermore, a continuous function (such as a sine or cosine function) can also be used when natural changes are desired.

Figure 17B:
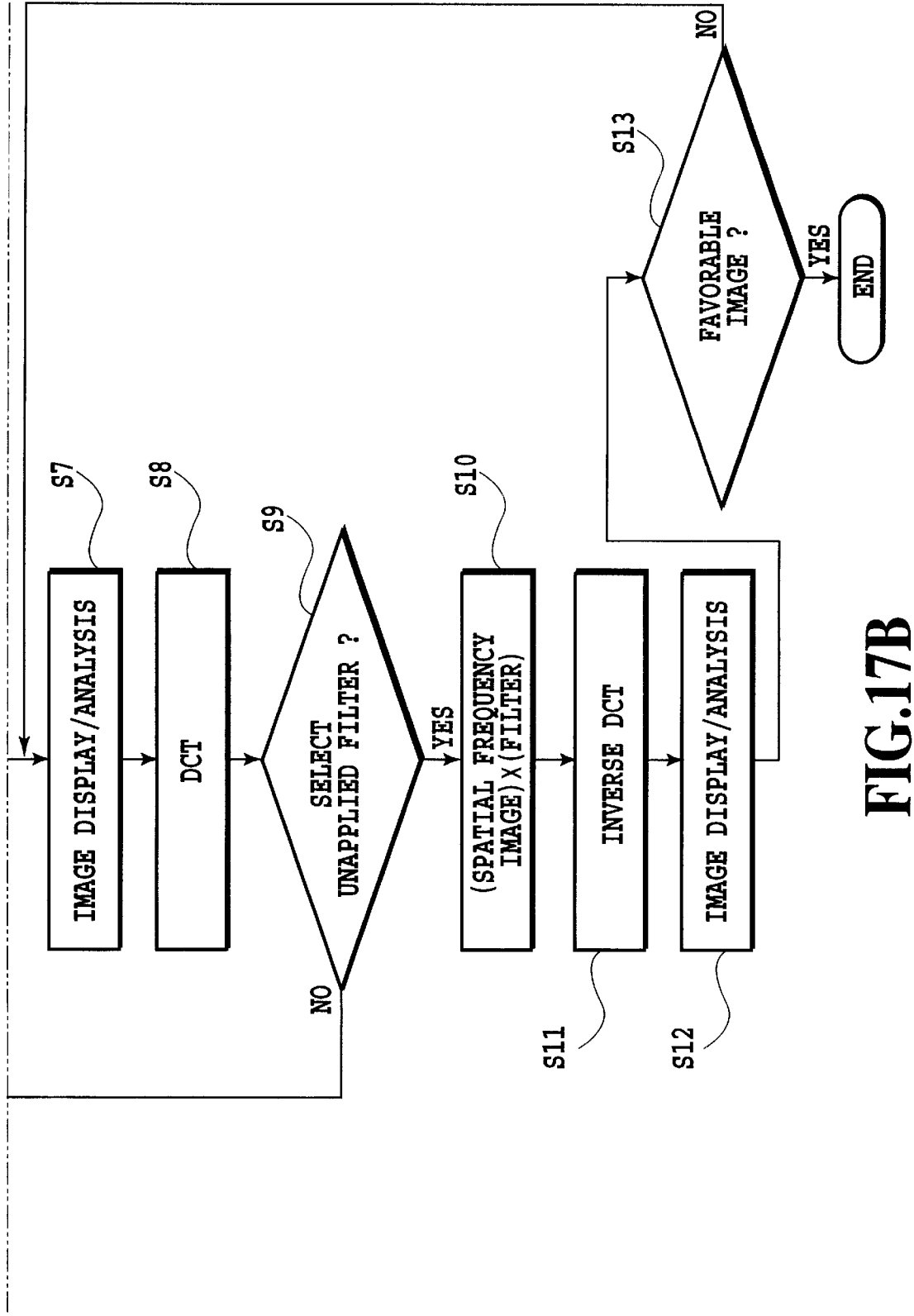
FIG. 17B is a flowchart illustrating the details of the first spatial frequency processing.

Next, details of the first spatial frequency filtering processing will be described with reference to the flowchart as shown in FIGS. 17A and 17B. The information required in each step is displayed on the display 8, and operation instructions needed are input from the input device 10.

At step S1, a multivalued image of interest is displayed on the display 8. The multivalued image data to be processed is an 8-bit data consisting of 512×512 pixels.

At step S2, as for the multivalued image of interest to be processed, a spatial frequency filter required for achieving an intended image quality is estimated. For example, to enhance a region in the multivalued image, the spatial frequency filter including the regions to be enhanced is estimated. In contrast, to weaken or eliminate a region in the multivalued image, the spatial frequency filter including the regions to be weakened or eliminated is estimated.

At step S3, the type of the spatial frequency filter is selected. For example, when the multivalued image data represents an 8-bit image with 512×512 pixels, the spatial frequency filter is also set at 512×512 in size. Alternatively, the spatial frequency image data can be divided into a plurality of blocks of the same size, and the spatial frequency filter can be configured to have the size of the blocks.

At step S4, values of individual positions in the spatial frequency filter are determined. The individual positions in the spatial frequency filter correspond to the individual positions, that is, the coefficients of the spatial frequency image data passing through the DCT processing.

For example, assuming that the individual positions in the spatial frequency filter are assigned values in the range of 1–0, and a certain frequency range in the image is to be enhanced. In this case, the positions corresponding to the frequencies to be enhanced are assigned 1 in the spatial frequency filter, whereas the remaining positions are assigned 0. When a certain frequency range is to be de-emphasized, the positions in the spatial frequency filter corresponding to the frequencies to be de-emphasized are assigned values near 0.

Moreover, a continuous function such as a sine, cosine or tangent function can also be used to determine the values of the individual positions in the spatial frequency filter when natural changes are desired.

FIG. 18 shows an example of numeric data 200 of a cosine function. Forming a two-dimensional damped waveform by using such characteristics of the cosine curve can generate (cos×cos) data 210 as shown in FIG. 19, in which an example of 10×10=100 pixels is shown. As for an image with 512×512 pixels, a filter with 512×512 cells is prepared. Alternatively, the spatial frequency image data can be divided into blocks of the same size, and a spatial frequency filter with the size of the block can be prepared.

Thus, the values of the spatial frequency filter are determined such that a desired image quality is obtained for the image. Many such spatial frequency filters are prepared to handle various cases.

At step S5, a check is made whether a sufficient number of types of the spatial frequency filters are prepared. For example, various types of filters such as lowpass filters, bandpass filters and highpass filters are prepared, so that 1, 0 or function values in the range of 1–0 are assigned to the values in the filters.

At step S6, the image to be actually processed is selected, and at step S7, the multivalued image is displayed on the display 8 to undergo content analysis.

At step S8, the multivalued image data is subjected to the DCT processing that converts the multivalued image data into frequency components to generate the spatial frequency image data.

Figure 20:
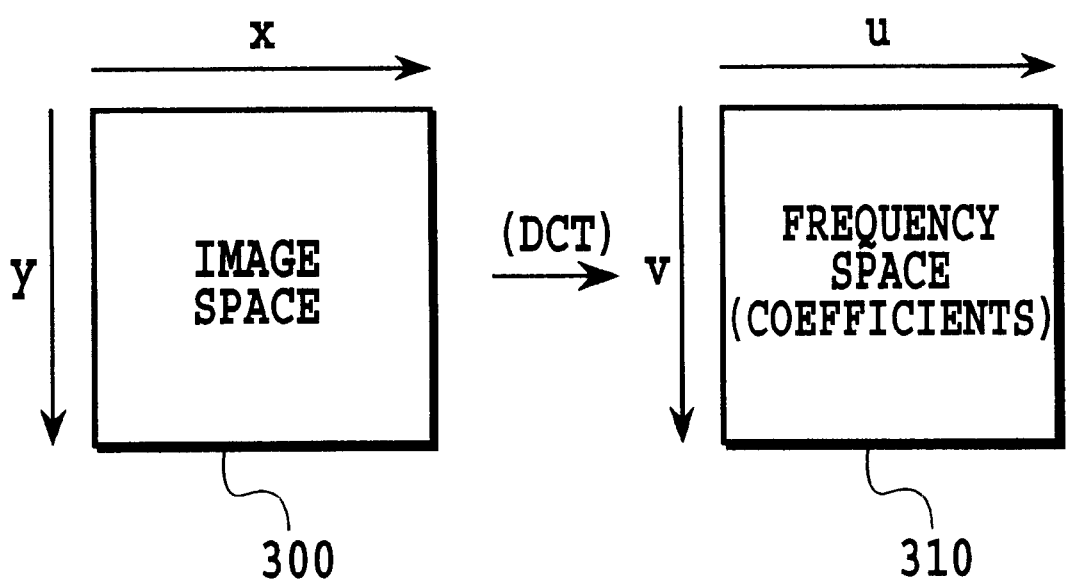
FIG. 20 is a diagram showing behavior in converting two-dimensional (x, y) multivalued image data 300 to two-dimensional (u, v) spatial frequency image data 310.

FIG. 20 illustrates the behavior of converting two-dimensional (x, y) multivalued image data 300 into two-dimensional (u, v) spatial frequency image data 310. Values of the matrix (u, v) are coefficients of the frequency components, in which u represents the frequency in the x direction, and v represents the frequency in the y direction.

FIGS. 21 and 22 each illustrate an example of the DCT processing. The example of FIG. 21 shows image data 320 and its corresponding spatial frequency image data 330 after the conversion. The example of FIG. 22 shows pure white image data 340 and its corresponding spatial frequency image data 350 after the conversion. In this case, only the coefficients ($y_{0,0}$) of the spatial frequency are present.

At step S9, one of the plurality of spatial frequency filters prepared in advance is selected. FIG. 23 shows a lowpass filter 360 corresponding to 2×2 pixels, and a highpass filter 370 corresponding to 3×3 pixels. The spatial frequency filters thus prepared are sequentially selected.

At step S10, the spatial frequency image data and the spatial frequency filter having one-to-one correspondence are multiplied.

Figure 24:
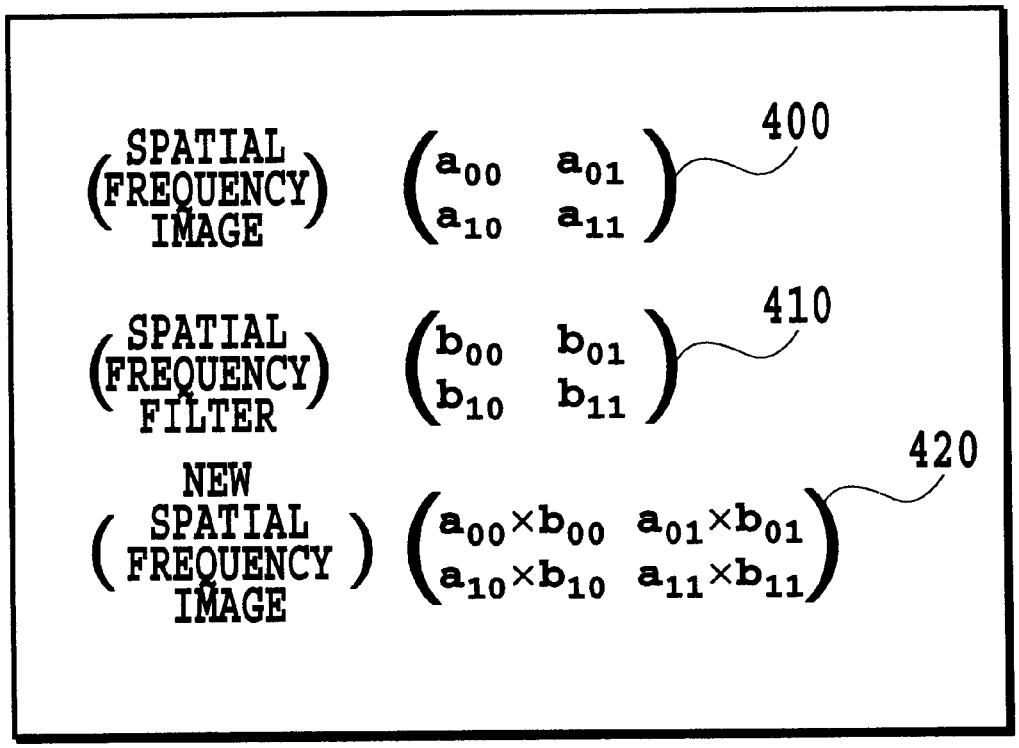
FIG. 24 is a diagram showing an example of multiplication using a spatial frequency filter.

FIG. 24 shows an example of the multiplication. Spatial frequency image data 400 is multiplied by the corresponding spatial frequency filter 410 to generate new spatial frequency image data 420.

FIG. 25 shows an example of actual numerical calculations. As described before, the new spatial frequency image 420, from which the harmonic components are removed, is obtained by multiplying the spatial frequency image data 350 by the lowpass filter 360.

At step S11, the new spatial frequency image data 110 undergoes the inverse DCT processing to obtain the new multivalued image data.

At step S12, the new multivalued image obtained is displayed on the display 8 to undergo the content analysis.

At step S13, estimation is made as to whether it is converted into a desired image quality. If not, the foregoing filter processing is iterated.

(II) Second Spatial Frequency Filtering Processing

The second spatial frequency filtering processing executes the following processings.

(1) For example, the multivalued image data passing through the prescribed processings in the foregoing Table 1 is subjected to the DCT processing.

(2) Only the coefficients of the frequencies to be enhanced are extracted from the spatial frequency image data.

(3) Only the coefficients extracted undergo the inverse DCT processing to generate the multivalued image data. The new multivalued image data obtained consists of only the frequency components to be enhanced.

(4) The new multivalued image data is added to the multivalued image data before the DCT processing. This will increase the sharpness of portions corresponding to the frequency components like edge portions of the image, for example. The new multivalued image data can be subtracted from the multivalued image data before the DCT processing.

Alternatively, it is also possible in the foregoing step (2) to extract, from the spatial frequency image data obtained, all the coefficients except for the coefficients of the frequencies to be de-emphasized. Except for this, the foregoing processings (1), (3) and (4) are executed. In this case, after the processing (4), an image is obtained in which portions corresponding to the prescribed frequency components are inconspicuous.

(III) Third Spatial Frequency Filtering Processing

The third spatial frequency filtering processing consists of executing the foregoing first spatial frequency filtering processing and second spatial frequency filtering processing. Either of the two processings can be executed first. This can provide, for example, a more effectively contour enhanced image.

Other Processings (I) Noise Elimination Processing

Pixels in a level including only a few pixels in an image will cause noise or obscure image quality. The effect of these pixels on the image cannot be sufficiently eliminated by the contour enhancement or contrast enhancement. Thus, the following noise elimination processing can be applied as needed.

Figure 26:
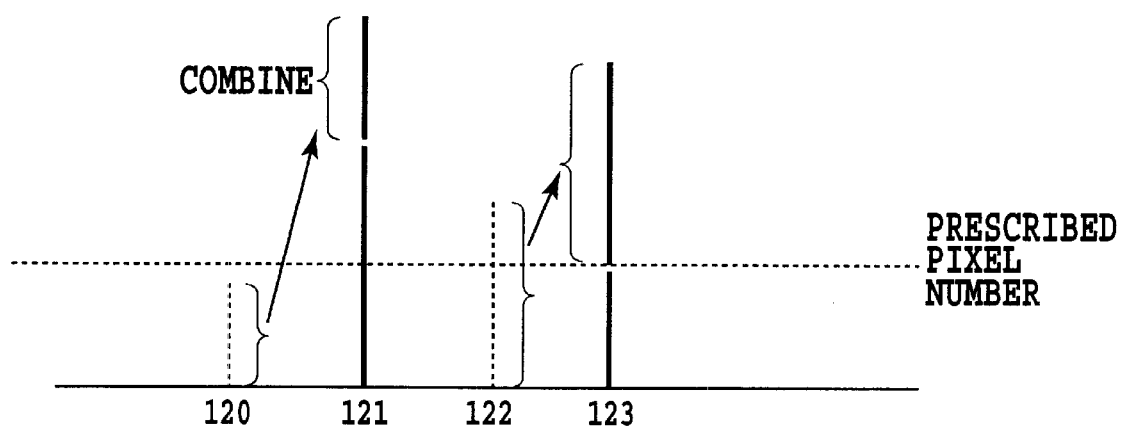
FIG. 26 is a diagram showing part of a histogram.

(1) First, with regard to the histogram of the multivalued image data, pixels in a level including only pixels equal to or less than a predetermined number of pixels (set pixel number) are added to pixels of an adjacent level to reconstruct a new histogram in accordance with the following rule so as to change the level of these pixels to the adjacent level, or the adjacent level to the level of these pixels. In other words, the rule is to pair adjacent odd and even levels, and adds the pixel number of the even level to that of the odd level, (thus changing the even level to the odd level). For example, as shown in FIG. 26 illustrating part of the histogram, when the pixel number of a level 120 is equal to or less than the set pixel number, these pixels are added to the pixels in the adjacent level 121. On the other hand, when the pixel number of a level 123 is equal to or less than the set pixel number, the pixels in the adjacent level 122 are added to the pixels in the level 123.

(2) Second, with regard to the reconstructed histogram of the multivalued image data, when there is a level including only pixels equal to or less than then set pixel number, these pixels are added to the pixels in immediately upper level (even level) to further reconstruct the histogram, thereby converting the level of the pixels equal to or less than the set pixel number to the immediately upper pixel level.

Incidentally, a very few pixels remaining in a level in the image do not have any effect to those who watch the image. Thus, selecting an appropriately set pixel number and iterating the foregoing processings (1) and (2) using the pixel number selected make it possible to obtain an optimum set pixel number, or a set pixel number achieving a desired image quality. In addition, when applying the rule in the foregoing processing (1), adjacent odd and even levels can be paired, and the level with the pixel number equal to or less than the set pixel number can be changed to its adjacent level.

The image data thus obtained will reduce the noise in the display image because the pixels in the levels with a low pixel number can be effectively eliminated.

(II) Reduction Processing of Bright and Dark Difference.

With regard to the multivalued image data, a decision can be made as to whether the coexistence is present of one or more extremely bright regions and one or more extremely dark regions. When the coexistence is present, a processing for reducing the difference between bright and dark regions can be carried out. The decision will now be described with reference to a histogram shown in FIG. 8. Although FIG. 8 is a histogram of individual blocks of the multivalued image data, it will be described as the histogram of the entire multivalued image data of a sheet of images. The decision of the coexistence is made in the histogram of the multivalued image data when (1) a predetermined number or more pixels are present in both levels corresponding to the bright and dark regions; and (2) there is not between these levels any level with pixels more than a rather few number a as shown in FIG. 8, and the number of levels with pixels equal to or less than a is equal to or greater than b and less than c. The coexistence is denied when there are pixels that do not meet at least one of the two conditions (1) and (2).

Although the values a, b and c can vary depending on human regions to which these values are applied, they can be determined experimentally. For example, they can be determined such as a is 15, b is 150 and c is 200.

Figure 9:
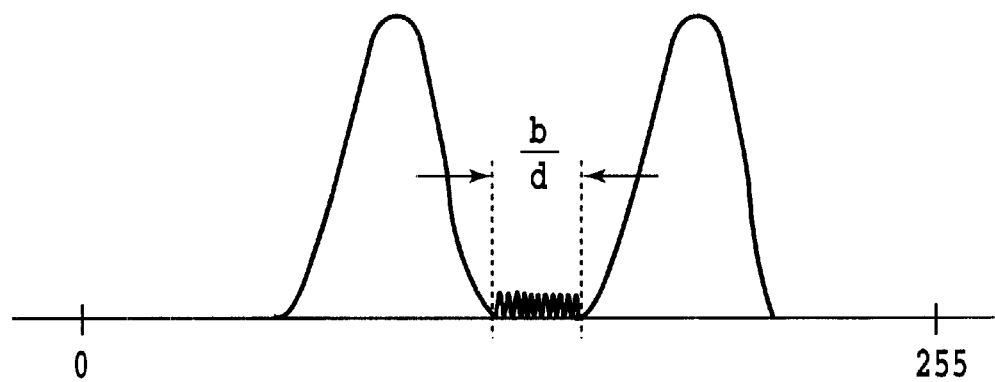
FIG. 9 is a diagram showing an example of a histogram after modifying pixel levels.

When the coexistence is decided, the number b1 of the levels with pixels equal to or less than a between the extremely bright regions and extremely dark regions is changed to b1/d as shown in FIG. 9. This change can be achieved, when d equals two, for example, by adding the pixels in the lowest level to the pixels to the next lowest level, and then the pixels in the third lowest level to the pixels in the fourth lowest level, and soon. The pixel levels in the extremely bright regions and extremely dark regions at both ends are simply shifted down or shifted up with maintaining their numbers of levels such that they are located continuously at both ends of the levels that are changed to b1/d. So far as the foregoing conditions are met, the pixels can be shifted in either directions toward the maximum value or toward the minimum value.

Thus changing the pixel levels, the difference between bright and dark regions in an image in which the extremely bright regions coexists with the extremely dark regions can be reduced, thereby providing an high quality image.

(III) Image Enhancement

Figure 27:
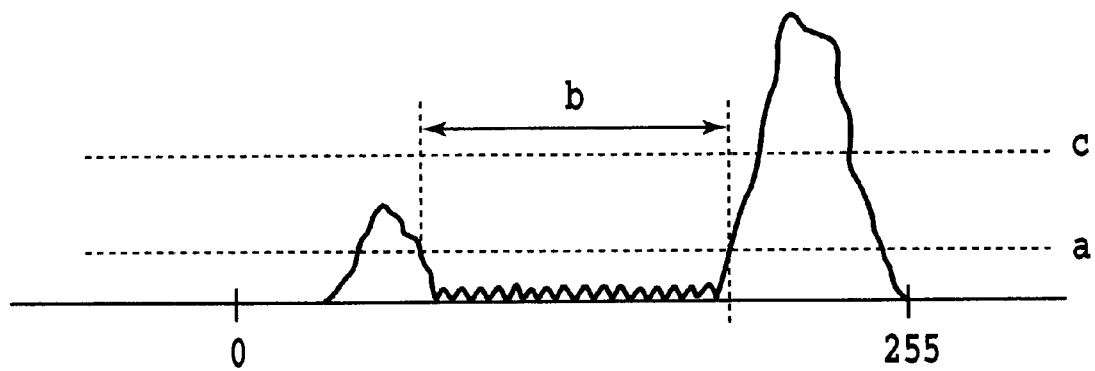
FIG. 27 is a diagram showing still another example of the histogram made from multivalued image data.
Figure 28:
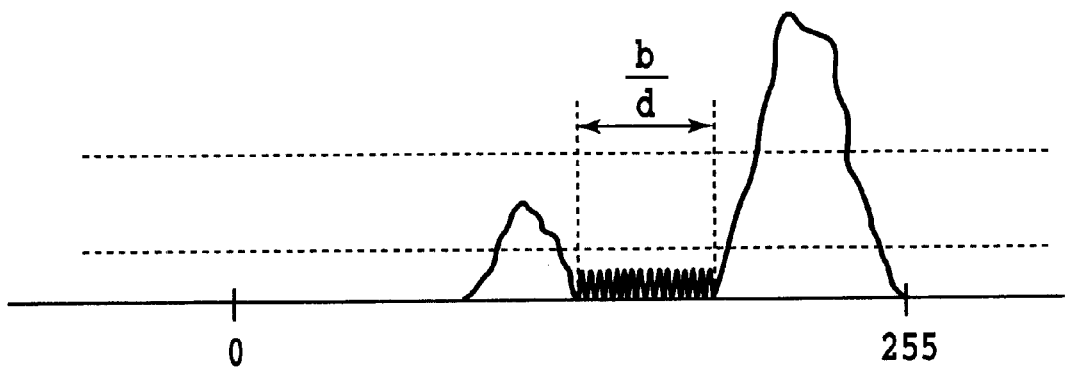
FIG. 28 is a diagram showing still another example of the histogram after modifying pixel levels.

The image enhancement is a processing that prevents small, dark, point-like pixels or blur contours in the multivalued image from being eliminated during binarization carried out by the printer driver. As for the multivalued image data of a sheet of image, the image plane is divided into a plurality of blocks, a histogram is generated for each block, and a decision is made for each block whether the following conditions are met. Specifically, as shown in a histogram of one block of FIG. 27, when the number of consecutive levels with pixels equal to or less than a (inclusive zero) is equal to or greater than b, and the number of levels with pixels greater than a and equal to or less than c is less than the number of levels with pixels greater than c, the histogram is changed as shown in FIG. 28. Specifically, the number b1 of the levels with pixels equal to or less than a, which are present by an amount equal to or greater than b, is changed to b1/d. This change can be achieved, when d equals two, for example, by adding the pixels in the lowest level to the pixels to the next lowest level, and then the pixels in the third lowest level to the pixels in the fourth lowest level, and so on. Without changing the pixel levels higher than the levels changed to b1/d, the pixel levels lower than the levels changed to b1/d are simply shifted up such that they are located continuously to the levels that are changed to b1/d. Although the values a, b and c can vary depending on human regions they are applied to, they can be determined experimentally.

(IV) Enlargement Processing

When the multivalued image data consists of a small number of pixels, it may be better to be enlarged. In this case, the following enlargement processing of the multivalued image data is carried out.

Figure 29:
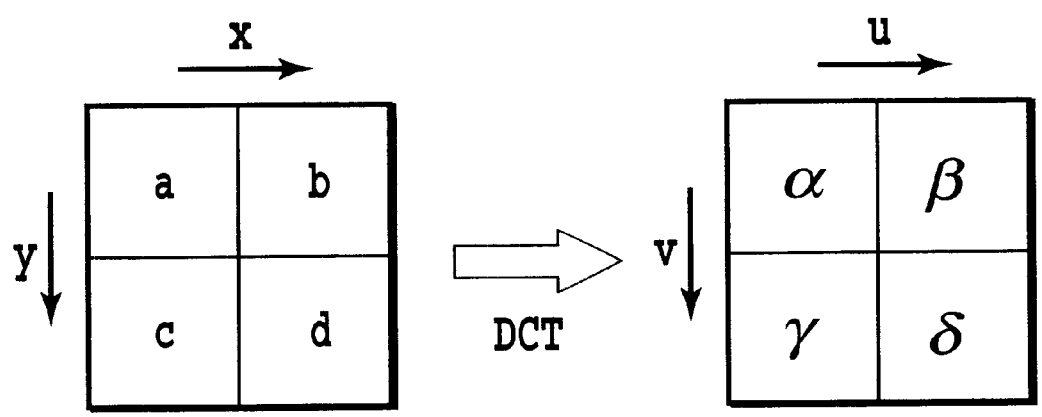
FIG. 29 is a diagram showing 2×2 pixel multivalued image data, and 2×2 spatial frequency image data obtained by the DCT processing.
Figure 30:
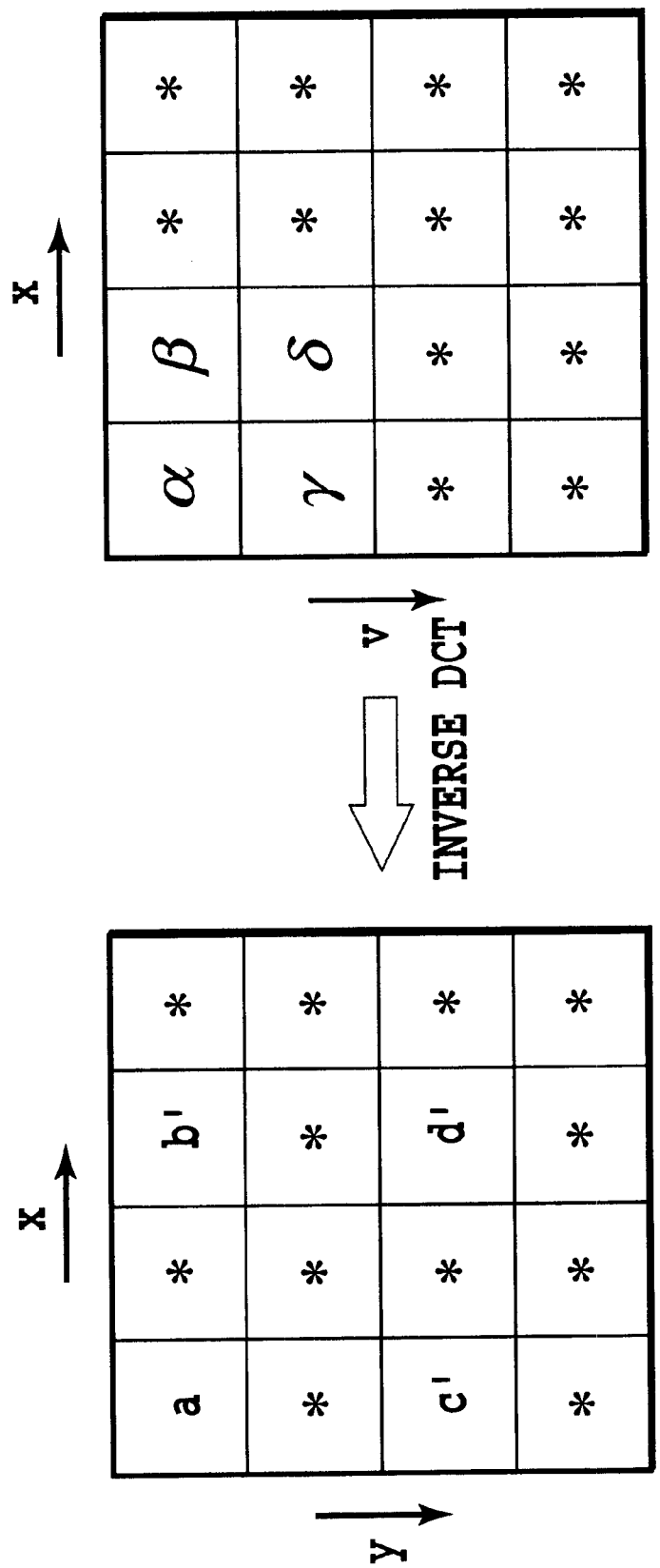
FIG. 30 is a diagram showing 4×4 spatial frequency image data, and 4×4 pixel multivalued image data obtained by an inverse DCT processing.
Figure 31:
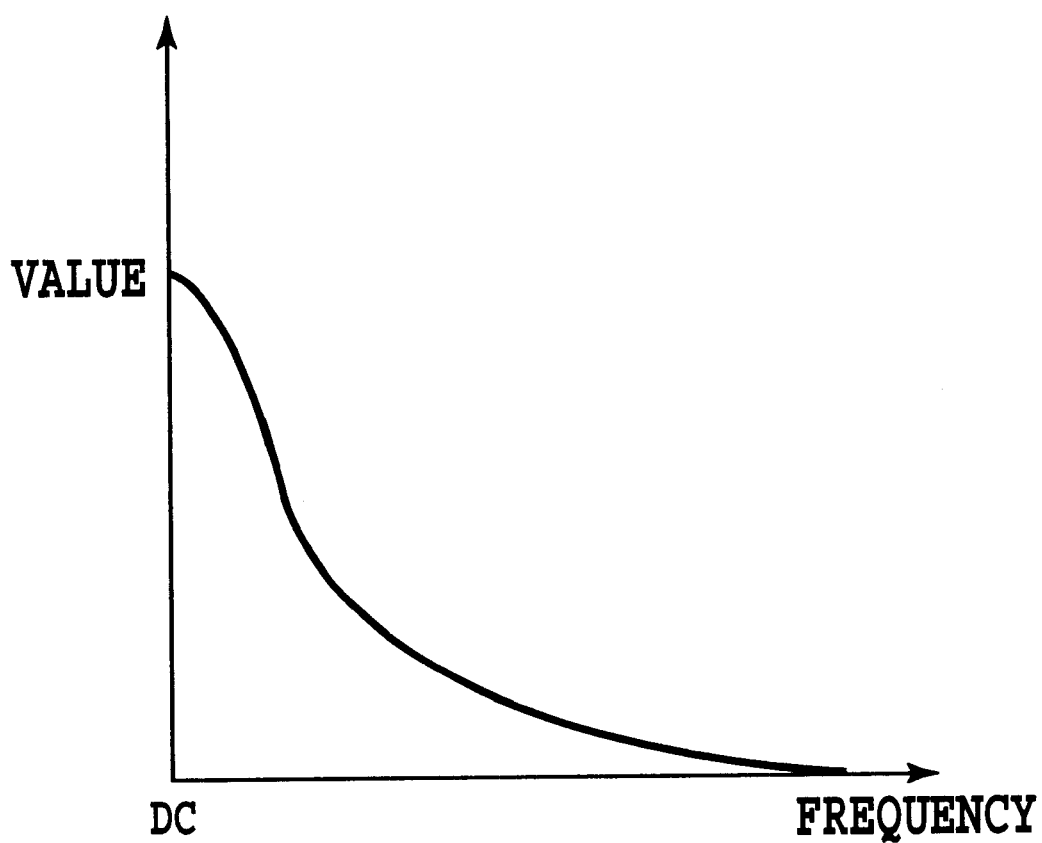
FIG. 31 is a graph showing coefficients of harmonic components of the spatial frequency filter.

As shown in FIG. 20 that is referred to in connection with the description of the first spatial frequency filtering processing, a frequency space is obtained by the DCT processing of an image space. For example, as shown in FIG. 29, 2×2 pixel multivalued image data is transformed to 2×2 spatial frequency image data. Here, as shown in FIG. 30, the 2×2 spatial frequency image data obtained by the DCT processing is transformed into 4×4 spatial frequency image data. In the 4×4 spatial frequency image data, $\alpha$, $\beta$, $\gamma$ and $\delta$ are coefficients originally present in the 2×2 spatial frequency image data, and the remaining data (denoted by *) are coefficients of harmonic components that are not originally present, but are optimally determined in accordance with the pictured region. Their addition can provide enlarged spatial frequency image data. The coefficients can take values that gradually decay from DC to high frequencies in both the u and v axes as shown in FIG. 31, for example. As described in connection with the second spatial frequency filtering processing, the coefficients can be placed at values that enhance particular frequency components depending on purposes of diagnosis. A set of the additional coefficients can be prepared in advance by experiments depending on the picked-up regions. The enlarged spatial frequency image data thus obtained is subjected to the inverse DCT processing to obtain an enlarged multivalued image space as shown in FIG. 30.

(V) Smoothing Processing

A multivalued image may sometimes include sharp transitions in contrast, which are often unnecessary. In this case, the smoothing processing will eliminate them.

The foregoing (I) noise elimination processing, (II) reduction processing of bright and dark difference, (III) image enhancement, (IV) enlargement processing, and (V) smoothing processing can be used by combining one or more of them as needed (the combination and execution sequence of them are not restricted), and can be executed as the final steps of the multivalued image processings shown in Table 1.

Next, the binarization processing at step S208 and the multivalue processing at step S210 in FIG. 2 will be described.

After completing the foregoing multivalued image processing, the multivalued image data undergoes the binarization processing using the systematic dither or the like by the printer driver program. The data obtained by the binarization processing is supplied to the printer 9 to produce a hard copy picture recorded on a recording medium in pseudo-gray levels. In the course of this, the multivalued image data to be displayed on the display 8 are generated by extracting the binary image data from the data obtained by the binarization processing, and by performing the multivalue processing of the binary image data extracted. The following multivalue processing is carried out to display on the display 8 such a multivalued image that can facilitate learning the image quality of a hard copy picture that would be recorded on the recording medium by the printer 9.

(I) Preconditions

A printer for recording binary images usually has different characteristics about the pixel size from a display for displaying multivalued images. The size of pixels the printer can record on a recording medium is usually greater than that of pixels the display can display.

Therefore, when the binary image data supplied to the printer is displayed on the display without change, the displayed image will be enlarged as compared with the image recorded on the recording medium as a hard copy. Thus, it sometimes occurs that the display cannot show the whole image (which will require extra operation such as scrolling), and this will reduce the efficiency of checking the image.

Figure 32:
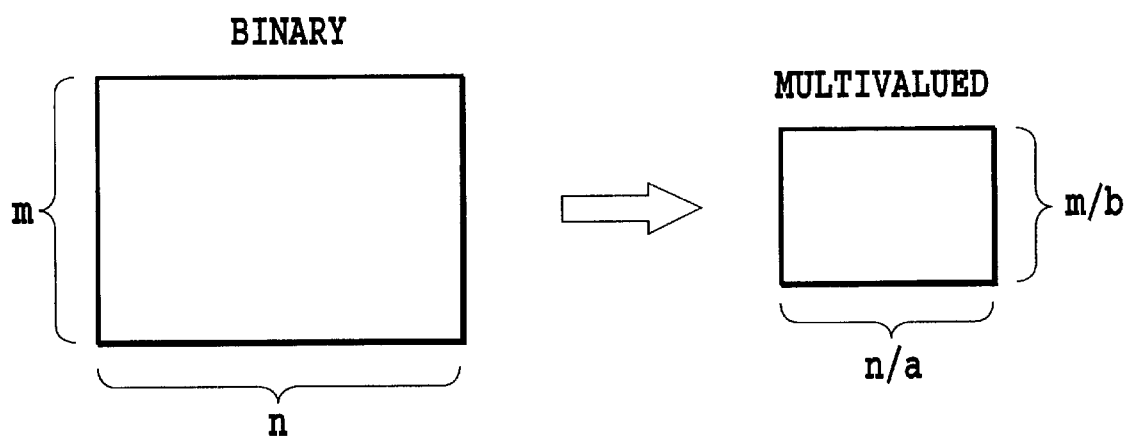
FIG. 32 is a diagram showing binary image data, and multivalued image data after simple averaging.
Figure 33:
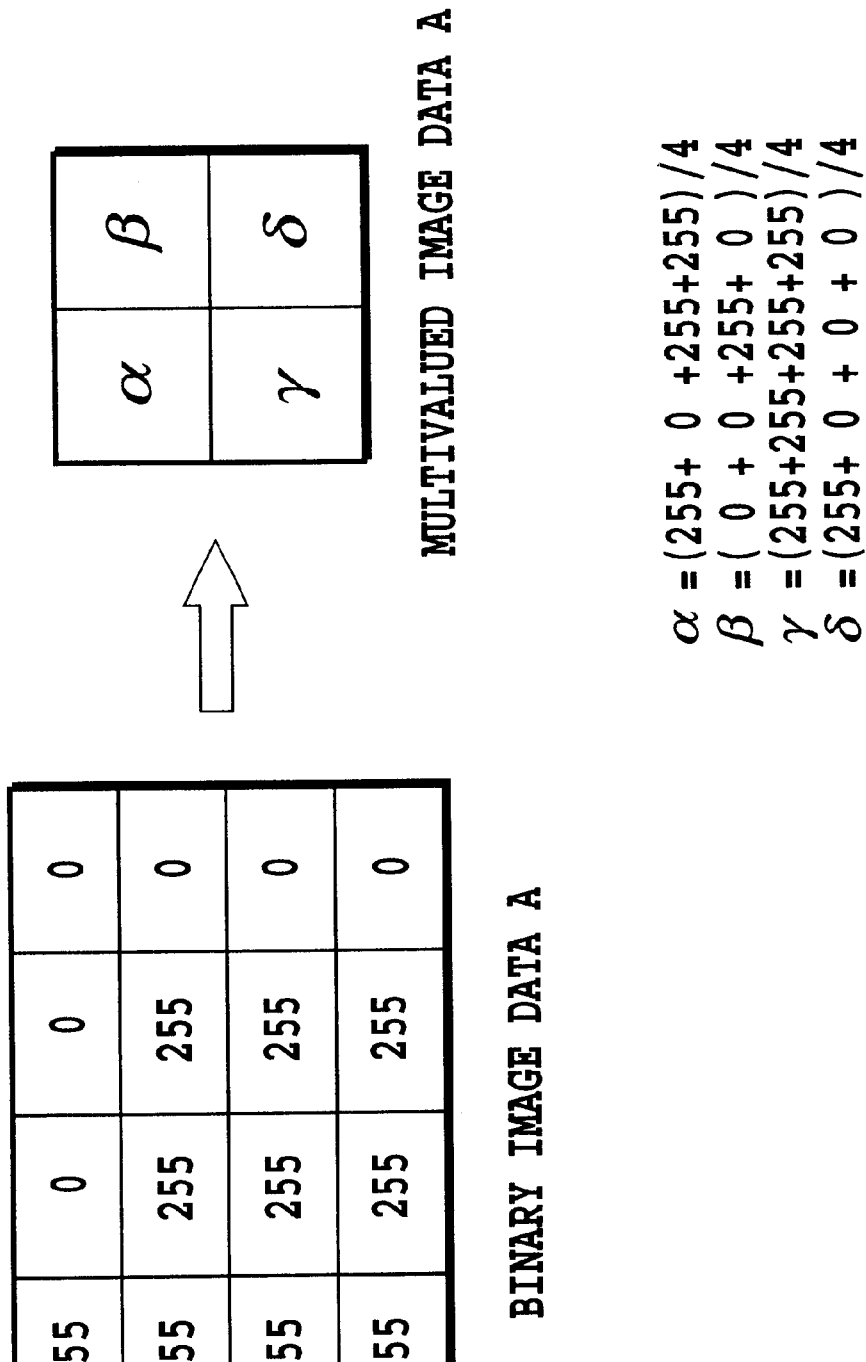
FIG. 33 is a diagram showing a concrete example of the simple averaging.

To solve this problem, it will be possible to display on the display the multivalued data that is obtained by calculating a simple average of each block of the binary image data to be supplied to the printer, each block consisting of a plurality of pixels adjacent on the image plane in the horizontal and vertical directions. In this case, an image, which is smaller than the image to be displayed on the display when the binary image data is not changed, is displayed on the display. Thus, the whole image can be displayed thereon. More specifically, when the binary image data consisting of m×n pixels as shown in FIG. 32 is subjected to the simple averaging taken for each block consisting of a×b pixels, the multivalued image data consisting of (m/a)×(n/b) pixels is obtained. An example of simple averages of the individual blocks is shown in FIG. 33.

The multivalued data supplied to the display, however, is obtained by simply averaging the binary image data to be supplied to the printer, and the gamma characteristic of the printer is not considered at all.

Thus, the image on the display will considerably differ from the hard copy pictures produced by the printer. For this reason, it is difficult to capture the image quality of the hard copy pictures that will be recorded by the printer by only watching the image on the display.

In view of this, one of the two following multivalue processings is executed.

(II) First Multivalue Processing

After completing the foregoing multivalued image processing, the multivalued image data is subjected to the binarization processing using the systematic dither or the like by the printer driver program of the printer 9 (S208). Then, the binary image data is extracted from the data obtained, and the multivalued image data to be displayed on the display 8 is obtained by simply averaging the extracted binary image data for each block consisting of a plurality of pixels adjacent to each other in the horizontal and vertical directions on the image plane. The resultant multivalued image data is subjected to the gamma characteristic of the printer 9. Specifically, because the multivalued image data to be displayed has undergone the gamma correction according to the gamma correction characteristic for correcting the gamma of the printer 9 in the foregoing multivalued image processing, it is corrected according to the gamma characteristic reversal to the gamma correction characteristic. This will provide the multivalued image data to be displayed with the same gamma characteristic as the gamma characteristic of the original multivalued image data, thereby enabling the display 8 to display the image with the image quality equivalent to that of hard copy pictures on which the gray levels of the original image are reproduced correctly by the foregoing multivalued image processing.

(III) Second Multivalue Processing

After completing the foregoing multivalued image processing, the multivalued image data is subjected to the binarization processing using the systematic dither or the like by the printer driver program of the printer 9 (S208). Then, the binary image data is extracted from the data obtained, and the multivalued image data to be displayed on the display 8 is obtained by simply averaging the extracted binary image data for each block consisting of a plurality of pixels adjacent to each other in the horizontal and vertical directions on the image plane. Varying the block size by changing the number of pixels therein, the size of the multivalued image to be displayed on the display 8 will also vary. In addition, the simple average of the binary data of each block also varies depending on the block size. Thus, the multivalued data to be displayed varies. In view of this, the multivalued image data to be displayed is corrected by correcting coefficients. The corrected coefficients are obtained for all the levels of the original multivalued image data. They take such values that will match the values of the multivalued data to be displayed to the values of the multivalued data of the original image. Here, the values of the multivalued data to be displayed are obtained by simply averaging, in each block with a specific block size, the binary image data obtained through the binarization processing at step S208. This correction will provide the multivalued image data, which has the specific block size and is to be displayed, with substantially the same gamma characteristic as the gamma characteristic of the original multivalued image data, thereby enabling the display 8 to display the image with the image quality equivalent to that of hard copy pictures on which the gray levels of the original image are reproduced correctly by the foregoing multivalued image processing.

To print a hard copy picture on a recording medium by the printer 9 after the foregoing steps S204–S212, the following method for ensuring the print result is applicable. The method for ensuring the print result can not only be carried out by the system as shown in FIG. 1, but also be applied for printing any other image processing results obtained by common personal computers, independently of the present embodiment.

The binary image data obtained as a result of the foregoing image processing can be printed into hard copy pictures with a desired image quality under specific conditions such as using a specific ink jet printer, specific ink and a specific recording medium. Accordingly, keeping these conditions will ensure the desired print result. As for the printer and printer driver, it is possible to limit them to specific types by selling them with the foregoing image processing program. However, as for the recording media to be used such as paper, there were no measures of limiting them. As a result, there were no guarantees that the desired effect can be obtained when printing the results of the image processing.

The present assurance method provides program users executing the foregoing image processings with a password and with prescribed sheets of recording medium that ensure the printed quality of the images processing. Inputting the password makes it possible to print hard copy pictures on the prescribed number of sheets of the recording medium with a desired image quality, that is, the hard copies with the same image quality as the original images obtained through the foregoing image processings.

In other words, in the present method for assuring the print result, the password is input which is assigned to the specific recording medium with which the print result of the image processing is assured, and only when the input password is correct, the printing is allowed.

Furthermore, when the password is correct, the number of sheets allowed is set from the input password so that the printing is carried out on the specific recording medium in that range.

In contrast, when the password is incorrect, the printing is not allowed, or the printing without ensuring the print result is permitted.

Next, an example of a password will be described with reference to FIG. 34, and an example of a routine for printing the results of the foregoing processings by the image processing program will be described with reference to FIG. 35.

Figure 34:
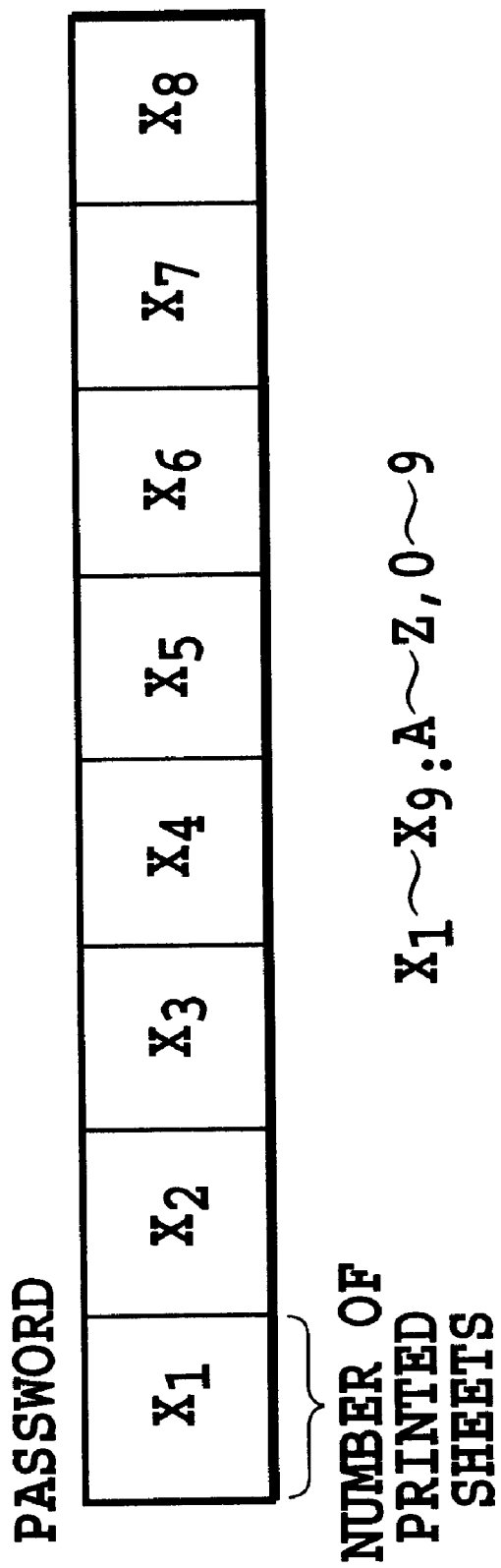
FIG. 34 is a diagram showing an example of a password.

FIG. 34 shows an example of a password provided to a user of the image processing program together with the specific recording medium with which the print result of the image processing is ensured. The password is assigned for every unit such as every 1000 sheets, for example. The password is generated using a rule that can be verified by a prescribed program. The example of the password as shown in FIG. 34 consists of eight bytes using numerals 0–9 and capital letters A–Z.

First, as an example of the rule that can verify such a password, the initial character x1 is assumed to represent the unit of sheets to which the password is assigned. For example, 1~3 represent 1000 sheets, 4~6 represent 5000 sheets and 7~9 represent 10000 sheets.

As a rule for the verification, the English letters are transformed to numerals in the alphabetic order, first. For example, they are assigned the sequence number counted from letter A, such as A is 1 and C is 3. Then, the bytes constituting the password are summed up, and the digits of the resultant sum are summed up. This process is repeated until the result becomes one digit. If the result obtained agrees with the initial byte of the 8-byte password, the password is considered to be correct.

For example, when the password is "85439114", the sum of the bytes is 8+5+4+3+9+1+1+4=35. Subsequently, the digits of the sum are summed up to obtain 3+5=8. Because the result 8 agrees with the initial numeral of the password, it is a correct password.

When the password is "A5439114", considering that A is 1, the sum of the bytes is A(=1)+5+4+3+9+1+1+4=28. The sum of the digits of the sum is 2+8=10. Because it is not one digit, the digits of the sum is added again to obtain 1+0=1. Because the resultant sum agrees with the initial byte of the password, it is decided as a correct password.

The foregoing rule for verifying the password is only an example for the explanation, and any algorithm can be applied as long as it can verify. Besides, the password is not limited to 8 bytes, and the letters used are not limited to alphanumeric characters.

Figure 35:
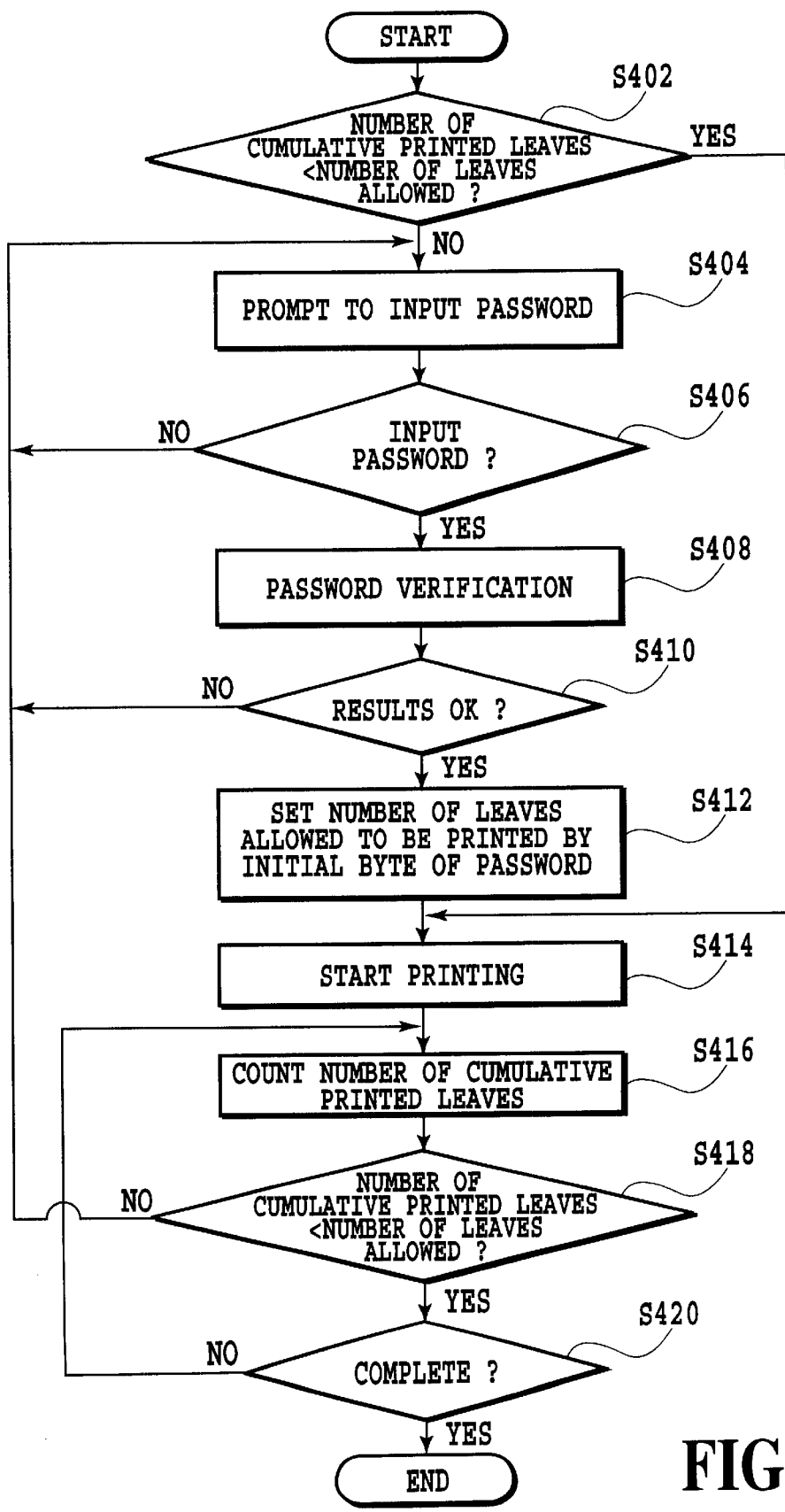
FIG. 35 is a flowchart illustrating an example of a routine for printing image processing results by an image processing program.

Next, a method of limiting the recording medium using the password as shown in FIG. 34 will be described with reference to the flowchart as shown in FIG. 35.

To print the foregoing image processing results, the routine as shown in FIG. 35 is started. First, the routine compares the cumulative number of printed sheets with the number of sheets allowed by the initial byte of the password (S402). Here, at the initial set in which the password has not yet input, the number of sheets allowed is zero. When the cumulative number is equal to or less than the number of sheets allowed (YES at S402), the printing is immediately started (S416). In contrast, when the cumulative number of printed sheets is equal to or greater than the number of sheets allowed, the routine resets the cumulative number of printed sheets, and outputs a message to prompt the user to input the password (S404), entering an input waiting state (S406). When the password is input, the routine checks whether the rule as described above is present or not (S408), and that the password currently input differs from the previous password to prevent the same password from being input. After the routine verified the correctness of the current password (YES at S410), it sets the number of printed sheets allowed by the initial digit (numeral) of the password (S412), and starts printing (S414). In this case, the number of printed sheets is added to the cumulative number of printed sheets (S416). If the cumulative number of printed sheets becomes equal to or greater than the number of sheets allowed (NO at S418), the routine resets the cumulative number of printed sheets, and requires the input of the password (S404). This is continued until the printing is completed. After completing the printing, the routine stores the cumulative number of printed sheets and the previous password to be used afterward.

A configuration is possible in which when the password is not input, the routine outputs a message that it cannot assure the print quality, and prints hard copy pictures on which the results of the foregoing image processings are not reflected.

A configuration is also possible in which the routine can detect the types of printers, and the password can identify the types of recording media. This has an advantage of being able to detect not only the number of sheets, but also that the recording medium is most suitable for the printer in the verifying processing of the input password.

Incidentally, although the hard copy pictures are usually monochrome binary images, it is also possible to obtain hard copy pictures that color individual levels to make them clear by using a color ink jet printer that can print color images as commonly used in nuclear medicine image processing, for example.

As recording media for recording hard copy pictures, it is possible to employ paper (with coating if needed), transparent film (such as PET, PVC (polyvinyl chloride), PS (polystyrene) and PC (polycarbonate)), opaque film (consisting of film with additives like pigment or mineral additives (such as $TiO_2$, $CaCO_3$) and translucent film.

The present invention can be applied not only to the stand-alone computer system as shown in FIG. 1, but also to a system such as a client server system consisting of a plurality of systems.

The configuration of the present invention can be implemented by reading the program in accordance with the present invention from a recording medium. As the recording media, there are floppy disks, hard disks, MOs, DVD-ROMs, CD-ROMs, magnetic tapes and ROM cassettes.

As other printers applicable to the present invention, there are electrophotographic printers that form on a drum an electrostatic latent image corresponding to image data, deposit toner particles thereon, and transfer the latent image onto a recording medium to be fused into place; and dot printers other than the ink jet printer.

What is claimed is:

1. An image processing apparatus comprising:
    a histogram generator for generating a histogram by dividing pixels constituting multivalued image data into levels;
    a multivalued image processor for processing the multivalued image data using the histogram generated by said histogram generator; and
    binarization means for converting the multivalued image data which are processed by said multivalued image processor, into binary image data representing pseudogray levels;
    wherein said multivalued image processor comprises:
        brightness-up means for shifting up entire pixel levels of the multivalued image data except for a pixel level with a maximum value;
        gamma correction means for carrying out gamma correction of the multivalued image data after shifting up the brightness; and
        contrast-up means for increasing contrast of the multivalued image data by changing a level of at least part of the pixels after the gamma correction into another level.

2. The image processing apparatus as claimed in claim 1, wherein said multivalued image processor further comprises black-down means for changing a level of pixels, which are present in a level equal to or less than a relative maximum near the minimum value of the multivalued image data after increasing the contrast by said contrast-up means, into the minimum value.

3. The image processing apparatus as claimed in claim 2, wherein said multivalued image processor further comprises a spatial frequency filtering processor for carrying out spatial frequency filtering processing of the multivalued image data passing through the level change by said black-down means.

4. An image processing apparatus comprising:
   a histogram generator for generating a histogram by dividing pixels constituting multivalued image data into levels;
   a multivalued image processor for processing the multivalued image data using the histogram generated by said histogram generator; and
   binarization means for converting the multivalued image data which are processed by said multivalued image processor, into binary image data representing pseudo-gray levels;
   wherein said multivalued image processor comprises:
      brightness-up means for shifting up entire pixel levels of the multivalued image data except for a pixel level with a maximum value;
      first contrast-up means for increasing contrast of the multivalued image data by changing into another level a level of at least part of the pixels after the shift-up;
      gamma correction means for carrying out gamma correction of the multivalued image data after level change by said first contrast-up means; and
      second contrast-up means for increasing contrast of the multivalued image data by changing a level of at least part of the pixels after the gamma correction into another level.

5. An image processing apparatus comprising:
   a histogram generator for generating a histogram by dividing pixels constituting multivalued image data into levels;
   a multivalued image processor for processing the multivalued image data using the histogram generated by said histogram generator; and
   binarization means for converting the multivalued image data which are processed by said multivalued image processor, into binary image data representing pseudo-gray levels;
   wherein said multivalued image processor comprises:
      level changing means for adding pixels near a maximum value and a minimum value of entire pixels of the multivalued image data to pixels of other levels;
      gamma correction means for carrying out gamma correction of the multivalued image data after the addition by said level changing means; and
      contrast-up means for increasing contrast of the multivalued image data by changing a level of at least part of the pixels after the gamma correction into another level.

6. The image processing apparatus as claimed in claim 5, wherein said multivalued image processor further comprises one of a noise elimination processor, a bright and dark difference reduction processor, an image enhancement processor, an enlargement processor and a smoothing processor, all of which are for processing the multivalued image data before being supplied to said binarization means.

7. An image processing apparatus comprising:
   a histogram generator for generating a histogram by dividing pixels constituting multivalued image data into levels;
   a multivalued image processor for processing the multivalued image data using the histogram generated by said histogram generator;
   binarization means for converting the multivalued image data which are processed by said multivalued image processor, into binary image data representing pseudo-gray levels;
   multivalue means for converting binary image data output from said binarization means into multivalued data to be displayed, and for outputting the multivalued data to be displayed;
   first gamma correction means for carrying out gamma correction of the multivalued data output from said multivalue means; and
   a display unit for displaying a multivalued image in response to the multivalued data passing through the gamma correction by said first gamma correction means;
   wherein said multivalued image processor comprises:
      brightness-up means for shifting up entire pixel levels of the multivalued image data except for a pixel level with a maximum value;
      second gamma correction means for carrying out gamma correction of the multivalued image data after shifting up the brightness; and
      contrast-up means for increasing contrast of the multivalued image data by changing a level of at least part of the pixels after gamma-corrected by the second gamma correction means into another level.

8. The image processing apparatus as claimed in claim 7, wherein said multivalued image processor further comprises black-down means for changing a level of pixels, which are present in a level equal to or less than a relative maximum near a minimum value of the multivalued image data after increasing the contrast by said contrast-up means, into the minimum value.

9. The image processing apparatus as claimed in claim 8, wherein said multivalued image processor further comprises a spatial frequency filtering processor for carrying out spatial frequency filtering processing of the multivalued image data passing through the level change by said black-down means.

10. An image processing apparatus comprising:
   a histogram generator for generating a histogram by dividing pixels constituting multivalued image data into levels;
   a multivalued image processor for processing the multivalued image data using the histogram generated by said histogram generator;
   binarization means for converting the multivalued image data which are processed by said multivalued image processor, into binary image data representing pseudo-gray levels;
   multivalue means for converting binary image data output from said binarization means into multivalued data to be displayed, and for outputting the multivalued data to be displayed;
   first gamma correction means for carrying out gamma correction of the multivalued data output from said multivalue means; and
   a display unit for displaying a multivalued image in response to the multivalued data passing through the gamma correction by said first gamma correction means;
   wherein said multivalued image processor comprises:
      brightness-up means for shifting up entire pixel levels of the multivalued image data except for a pixel level with a maximum value;

first contrast-up means for increasing contrast of the multivalued image data by changing into another level a level of at least part of the pixels after the shift-up;

second gamma correction means for carrying out gamma correction of the multivalued image data after level change by said first contrast-up means; and second contrast-up means for increasing contrast of the multivalued image data by changing a level of at least part of the pixels after gamma-corrected by the second gamma correction means into another level.

11. An image processing apparatus comprising:

a histogram generator for generating a histogram by dividing pixels constituting multivalued image data into levels;

a multivalued image processor for processing the multivalued image data using the histogram generated by said histogram generator;

binarization means for converting the multivalued image data which are processed by said multivalued image processor, into binary image data representing pseudo-gray levels;

multivalue means for converting binary image data output from said binarization means into multivalued data to be displayed, and for outputting the multivalued data to be displayed;

first gamma correction means for carrying out gamma correction of the multivalued data output from said multivalue means; and a display unit for displaying a multivalued image in response to the multivalued data passing through the gamma correction by said first gamma correction means;

wherein said multivalued image processor comprises:
    level changing means for adding pixels near a maximum value and a minimum value of entire pixels of the multivalued image data to pixels of another level;
    second gamma correction means for carrying out gamma correction of the multivalued image data after the addition by said level changing means; and
    contrast-up means for increasing contrast of the multivalued image data by changing a level of at least part of the pixels after gamma-corrected by the second gamma correction means into another level.

12. The image processing apparatus as claimed in claim 11, wherein said multivalued image processor further comprises one of a noise elimination processor, a bright and dark difference reduction processor, an image enhancement processor, an enlargement processor and a smoothing processor, all of which are for processing the multivalued image data before being supplied to said binarization means.

13. An image processing method comprising:

a histogram generating step of generating a histogram by dividing pixels constituting multivalued image data into levels;

a multivalued image processing step of processing the multivalued image data using the histogram generated by said histogram generating; and a binarization step of converting the multivalued image data which are processed by said multivalued image processing, into binary image data representing pseudo-gray levels;

wherein said multivalued image processing step comprises:

a brightness-up step of shifting up entire pixel levels of the multivalued image data except for a pixel level with a maximum value;

a gamma correction step of carrying out gamma correction of the multivalued image data after shifting up the brightness; and a contrast-up step of increasing contrast of the multivalued image data by changing a level of at least part of the pixels after the gamma correction into another level.

14. The image processing method as claimed in claim 13, wherein said multivalued image processing step further comprises a black-down step of changing a level of pixels, which are present in a level equal to or less than a relative maximum near the minimum value of the multivalued image data after increasing the contrast, into the minimum value.

15. The image processing method as claimed in claim 14, wherein said multivalued image processing step further carries out a spatial frequency filtering processing of the multivalued image data passing through the level change by the black-down.

16. An image processing method comprising:

a histogram generating step of generating a histogram by dividing pixels constituting multivalued image data into levels;

a multivalued image processing step of processing the multivalued image data using the histogram generated by said histogram generating; and a binarization step of converting the multivalued image data which are processed by said multivalued image processing, into binary image data representing pseudo-gray levels;

wherein said multivalued image processing step comprises:

a brightness-up step of shifting up entire pixel levels of the multivalued image data except for a pixel level with a maximum value;

a first contrast-up step of increasing contrast of the multivalued image data by changing into another level a level of at least part of the pixels after the shift-up;

a gamma correction step of carrying out gamma correction of the multivalued image data after level change by the first contrast-up; and a second contrast-up step of increasing contrast of the multivalued image data by changing a level of at least part of the pixels after the gamma correction into another level.

17. An image processing method comprising:

a histogram generating step of generating a histogram by dividing pixels constituting multivalued image data into levels;

a multivalued image processing step of processing the multivalued image data using the histogram generated by said histogram generating; and a binarization step of converting the multivalued image data which are processed by said multivalued image processing, into binary image data representing pseudo-gray levels;

wherein said multivalued image processing step comprises:

a level changing step of adding pixels near a maximum value and a minimum value of entire pixels of the multivalued image data to pixels of other levels;

a gamma correction step of carrying out gamma correction of the multivalued image data after the addition by the level changing; and a contrast-up step of increasing contrast of the multivalued image data by changing a level of at least part of the pixels after the gamma correction into another level.

18. The image processing method as claimed in claim 17, wherein said multivalued image processing step further comprises one of a noise elimination step, a bright and dark difference reduction step, an image enhancement step, an enlargement step and a smoothing step, all of which are for processing the multivalued image data before the binarization.

19. An image processing method comprising:
a histogram generating step of generating a histogram by dividing pixels constituting multivalued image data into levels;
a multivalued image processing step of processing the multivalued image data using the histogram generated by said histogram generating;
a binarization step of converting the multivalued image data which are processed by said multivalued image processing, into binary image data representing pseudo-gray levels;
a multivalue step of converting binary image data obtained by said binarization into multivalued data to be displayed, and of outputting the multivalued data to be displayed;
a first gamma correction step of carrying out gamma correction of the multivalued data obtained by the multivalue converting; and
a display step of displaying a multivalued image in response to the multivalued data passing through the first gamma correction step;
wherein said multivalued image processing step comprises:
a brightness-up step of shifting up entire pixel levels of the multivalued image data except for a pixel level with a maximum value;
a second gamma correction step of carrying out gamma correction of the multivalued image data after shifting up the brightness; and
a contrast-up step of increasing contrast of the multivalued image data by changing a level of at least part of the pixels after the second gamma correction step into another level.

20. The image processing method as claimed in claim 19, wherein said multivalued image processing step further comprises a black-down step of changing a level of pixels, which are present in a level equal to or less than a relative maximum near the minimum value of the multivalued image data after increasing the contrast, into the minimum value.

21. The image processing method as claimed in claim 20, wherein said multivalued image processing step further carries out a spatial frequency filtering processing of the multivalued image data passing through the level change by the black-down.

22. An image processing method comprising:
a histogram generating step of generating a histogram by dividing pixels constituting multivalued image data into levels;
a multivalued image processing step of processing the multivalued image data using the histogram generated by said histogram generating;
a binarization step of converting the multivalued image data which are processed by said multivalued image processing, into binary image data representing pseudo-gray levels;
a multivalue step of converting binary image data obtained by said binarization into multivalued data to be displayed, and of outputting the multivalued data to be displayed;
a first gamma correction step of carrying out gamma correction of the multivalued data obtained by the multivalue converting; and
a display step of displaying a multivalued image in response to the multivalued data passing through the first gamma correction step;
wherein said multivalued image processing step comprises:
a brightness-up step of shifting up entire pixel levels of the multivalued image data except for a pixel level with a maximum value;
a first contrast-up step of increasing contrast of the multivalued image data by changing into another level a level of at least part of the pixels after the shift-up;
a second gamma correction step of carrying out gamma correction of the multivalued image data after level change by the first contrast-up; and
a second contrast-up step of increasing contrast of the multivalued image data by changing a level of at least part of the pixels after the second gamma correction step into another level.

23. An image processing method comprising:
a histogram generating step of generating a histogram by dividing pixels constituting multivalued image data into levels;
a multivalued image processing step of processing the multivalued image data using the histogram generated by said histogram generating;
a binarization step of converting the multivalued image data which are processed by said multivalued image processing, into binary image data representing pseudo-gray levels;
a multivalue step of converting binary image data obtained by said binarization into multivalued data to be displayed, and of outputting the multivalued data to be displayed;
a first gamma correction step of carrying out gamma correction of the multivalued data obtained by the multivalue converting; and
a display step of displaying a multivalued image in response to the multivalued data passing through the first gamma correction step;
wherein said multivalued image processing step comprises:
a level changing step of adding pixels near a maximum value and a minimum value of entire pixels of the multivalued image data to pixels of other levels;
a second gamma correction step of carrying out gamma correction of the multivalued image data after the addition by the level changing; and
a contrast-up step of increasing contrast of the multivalued image data by changing a level of at least part of the pixels after the second gamma correction step into another level.

24. The image processing method as claimed in claim 23, wherein said multivalued image processing step further comprises one of a noise elimination step, a bright and dark difference reduction step, an image enhancement step, an enlargement step and a smoothing step, all of which are for processing the multivalued image data before the binarization.

25. A recording medium having computer readable image processing program code means for causing a computer to process image data, said image processing program code means causing the computer to execute:
- a histogram generating step of generating a histogram by dividing pixels constituting multivalued image data into levels;
- a multivalued image processing step of processing the multivalued image data using the histogram generated by said histogram generating; and
- a binarization step of converting the multivalued image data which are processed by said multivalued image processing, into binary image data representing pseudo-gray levels;
- wherein said multivalued image processing step comprises:
  - a brightness-up step of shifting up entire pixel levels of the multivalued image data except for a pixel level with a maximum value;
  - a gamma correction step of carrying out gamma correction of the multivalued image data after shifting up the brightness; and
  - a contrast-up step of increasing contrast of the multivalued image data by changing a level of at least part of the pixels after the gamma correction into another level.

26. The recording medium having computer readable image processing program code means as claimed in claim 25, wherein said multivalued image processing step further comprises a black-down step of changing a level of pixels, which are present in a level equal to or less than a relative maximum value near the minimum value of the multivalued image data after increasing the contrast, into the minimum value.

27. The recording medium having computer readable image processing program code means as claimed in claim 26, wherein said multivalued image processing step further carries out a spatial frequency filtering processing of the multivalued image data passing through the level change by the black-down.

28. A recording medium having computer readable image processing program code means for causing a computer to process image data, said image processing program code means causing the computer to execute:
- a histogram generating step of generating a histogram by dividing pixels constituting multivalued image data into levels;
- a multivalued image processing step of processing the multivalued image data using the histogram generated by said histogram generating; and
- a binarization step of converting the multivalued image data which are processed by said multivalued image processing, into binary image data representing pseudo-gray levels;
- wherein said multivalued image processing step comprises:
  - a brightness-up step of shifting up entire pixel levels of the multivalued image data except for a pixel level with a maximum value;
  - a first contrast-up step of increasing contrast of the multivalued image data by changing into another level a level of at least part of the pixels after the shift-up;
  - a gamma correction step of carrying out gamma correction of the multivalued image data after level change by the first contrast-up; and
  - a second contrast-up step of increasing contrast of the multivalued image data by changing a level of at least part of the pixels of the entire pixels after the gamma correction into another level.

29. A recording medium having computer readable image processing program code means for causing a computer to process image data, said image processing program code means causing the computer to execute:
- a histogram generating step of generating a histogram by dividing pixels constituting multivalued image data into levels;
- a multivalued image processing step of processing the multivalued image data using the histogram generated by said histogram generating; and
- a binarization step of converting the multivalued image data which are processed by said multivalued image processing, into binary image data representing pseudo-gray levels;
- wherein said multivalued image processing step comprises:
  - a level changing step of adding pixels near a maximum value and a minimum value of entire pixels of the multivalued image data to pixels of other levels;
  - a gamma correction step of carrying out gamma correction of the multivalued image data after the addition by the level changing; and
  - a contrast-up step of increasing contrast of the multivalued image data by changing a level of at least part of the pixels of the entire pixels after the gamma correction into another level.

30. The recording medium having computer readable image processing program code means as claimed in claim 29, wherein said multivalued image processing step further comprises one of a noise elimination step, a bright and dark difference reduction step, an image enhancement step, an enlargement step and a smoothing step, all of which are for processing the multivalued image data before the binarization.

31. A recording medium having computer readable image processing program code means for causing a computer to process image data, said image processing program code means causing the computer to execute:
- a histogram generating step of generating a histogram by dividing pixels constituting multivalued image data into levels;
- a multivalued image processing step of processing the multivalued image data using the histogram generated by said histogram generating;
- a binarization step of converting the multivalued image data which are processed by said multivalued image processing, into binary image data representing pseudo-gray levels;
- a multivalue step of converting binary image data obtained by said binarization into multivalued data to be displayed, and of outputting the multivalued data to be displayed;
- a first gamma correction step of carrying out gamma correction of the multivalued data obtained by the multivalue converting; and
- a display step of displaying a multivalued image in response to the multivalued data passing through the first gamma correction step;
- wherein said multivalued image processing step comprises:
  - a brightness-up step of shifting up entire pixel levels of the multivalued image data except for a pixel level with a maximum value;

a second gamma correction step of carrying out gamma correction of the multivalued image data after shifting up the brightness; and a contrast-up step of increasing contrast of the multivalued image data by changing a level of at least part of the pixels after the second gamma correction step into another level.

32. The recording medium having computer readable image processing program code means as claimed in claim 31, wherein said multivalued image processing step further comprises a black-down step of changing a level of pixels, which are present in a level equal to or less than a relative maximum near the minimum value of the multivalued image data after increasing the contrast, into the minimum value.

33. The recording medium having computer readable image processing program code means as claimed in claim 32, wherein said multivalued image processing step further carries out a spatial frequency filtering processing of the multivalued image data passing through the level change by the black-down.

34. A recording medium having computer readable image processing program code means for causing a computer to process image data, said image processing program code means causing the computer to execute:

a histogram generating step of generating a histogram by dividing pixels constituting multivalued image data into levels;

a multivalued image processing step of processing the multivalued image data using the histogram generated by said histogram generating;

a binarization step of converting the multivalued image data which are processed by said multivalued image processing, into binary image data representing pseudo-gray levels;

a multivalue step of converting binary image data obtained by said binarization into multivalued data to be displayed, and of outputting the multivalued data to be displayed;

a first gamma correction step of carrying out gamma correction of the multivalued data obtained by the multivalue converting; and a display step of displaying a multivalued image in response to the multivalued data passing through the first gamma correction step;

wherein said multivalued image processing step comprises:

a brightness-up step of shifting up entire pixel levels of the multivalued image data except for a pixel level with a maximum value;

a first contrast-up step of increasing contrast of the multivalued image data by changing into another level a level of at least part of the pixels after the shift-up;

a second gamma correction step of carrying out gamma correction of the multivalued image data after level change by the first contrast-up; and a second contrast-up step of increasing contrast of the multivalued image data by changing a level of at least part of the pixels after the second gamma correction step into another level.

35. A recording medium having computer readable image processing program code means for causing a computer to process image data, said image processing program code means causing the computer to execute:

a histogram generating step of generating a histogram by dividing pixels constituting multivalued image data into levels;

a multivalued image processing step of processing the multivalued image data using the histogram generated by said histogram generating;

a binarization step of converting the multivalued image data which are processed by said multivalued image processing, into binary image data representing pseudo-gray levels;

a multivalue step of converting binary image data obtained by said binarization into multivalued data to be displayed, and of outputting the multivalued data to be displayed;

a first gamma correction step of carrying out gamma correction of the multivalued data obtained by the multivalue converting; and a display step of displaying a multivalued image in response to the multivalued data passing through the first gamma correction step;

wherein said multivalued image processing step comprises:

a level changing step of adding pixels near a maximum value and a minimum value of entire pixels of the multivalued image data to pixels of other levels;

a second gamma correction step of carrying out gamma correction of the multivalued image data after the addition by the level changing; and a contrast-up step of increasing contrast of the multivalued image data by changing a level of at least part of the pixels after the second gamma correction step into another level.

36. The recording medium having computer readable image processing program code means as claimed in claim 35, wherein said multivalued image processing step further comprises one of a noise elimination step, a bright and dark difference reduction step, an image enhancement step, an enlargement step and a smoothing step, all of which are for processing the multivalued image data before the binarization.

37. The image processing apparatus as claimed in any one of claims 1, 2 and 3, wherein said multivalued image processor further comprises one of a noise elimination processor, a bright and dark difference reduction processor, an image enhancement processor, an enlargement processor and a smoothing processor, all of which are for processing the multivalued image data before being supplied to said binarization means.

38. The image processing apparatus as claimed in claim 4, wherein said multivalued image processor further comprises one of a noise elimination processor, a bright and dark difference reduction processor, an image enhancement processor, an enlargement processor and a smoothing processor, all of which are for processing the multivalued image data before being supplied to said binarization means.

39. The image processing apparatus as claimed in any one of claims 7, 8 and 9, wherein said multivalued image processor further comprises one of a noise elimination processor, a bright and dark difference reduction processor, an image enhancement processor, an enlargement processor and a smoothing processor, all of which are for processing the multivalued image data before being supplied to said binarization means.

40. The image processing apparatus as claimed in claim 10, wherein said multivalued image processor further comprises one of a noise elimination processor, a bright and dark difference reduction processor, an image enhancement processor, an enlargement processor and a smoothing processor, all of which are for processing the multivalued image data before being supplied to said binarization means.

41. The image processing method as claimed in any one of claims 13, 14 and 15, wherein said multivalued image processing step further comprises one of a noise elimination step, a bright and dark difference reduction step, an image enhancement step, an enlargement step and a smoothing step, all of which are for processing the multivalued image data before the binarization.

42. The image processing method as claimed in claim 16, wherein said multivalued image processing step further comprises one of a noise elimination step, a bright and dark difference reduction step, an image enhancement step, an enlargement step and a smoothing step, all of which are for processing the multivalued image data before the binarization.

43. The image processing method as claimed in any one of claims 19, 20 and 21, wherein said multivalued image processing step further comprises one of a noise elimination step, a bright and dark difference reduction step, an image enhancement step, an enlargement step and a smoothing step, all of which are for processing the multivalued image data before the binarization.

44. The image processing method as claimed in claim 22, wherein said multivalued image processing step further comprises one of a noise elimination step, a bright and dark difference reduction step, an image enhancement step, an enlargement step and a smoothing step, all of which are for processing the multivalued image data before the binarization.

45. The recording medium having computer readable image processing program code means as claimed in any one of claims 25, 26 and 27, wherein said multivalued image processing step further comprises one of a noise elimination step, a bright and dark difference reduction step, an image enhancement step, an enlargement step and a smoothing step, all of which are for processing the multivalued image data before the binarization.

46. The recording medium having computer readable image processing program code means as claimed in claim 28, wherein said multivalued image processing step further comprises one of a noise elimination step, a bright and dark difference reduction step, an image enhancement step, an enlargement step and a smoothing step, all of which are for processing the multivalued image data before the binarization.

47. The recording medium having computer readable image processing program code means as claimed in any one of claims 31, 32 and 33, wherein said multivalued image processing step further comprises one of a noise elimination step, a bright and dark difference reduction step, an image enhancement step, an enlargement step and a smoothing step, all of which are for processing the multivalued image data before the binarization.

48. The recording medium having computer readable image processing program code means as claimed in claim 34, wherein said multivalued image processing step further comprises one of a noise elimination step, a bright and dark difference reduction step, an image enhancement step, an enlargement step and a smoothing step, all of which are for processing the multivalued image data before the binarization.

\* \* \* \* \*